(12) United States Patent
Mizuno et al.

(10) Patent No.: US 12,197,157 B2
(45) Date of Patent: Jan. 14, 2025

(54) IMAGE FORMING APPARATUS

(71) Applicant: BROTHER KOGYO KABUSHIKI KAISHA, Nagoya (JP)

(72) Inventors: Yusuke Mizuno, Nagoya (JP); Shintaro Sakaguchi, Nagoya (JP); Noriaki Kishimoto, Niwa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/347,062

(22) Filed: Jul. 5, 2023

(65) Prior Publication Data
US 2024/0012355 A1  Jan. 11, 2024

(30) Foreign Application Priority Data

Jul. 6, 2022 (JP) .................. 2022-109239

(51) Int. Cl.
*G03G 15/23* (2006.01)
*G06K 15/16* (2006.01)

(52) U.S. Cl.
CPC .......... *G03G 15/234* (2013.01); *G06K 15/16* (2013.01)

(58) Field of Classification Search
CPC .............................. G03G 15/234; G03K 15/16
See application file for complete search history.

(56) References Cited

U.S. PATENT DOCUMENTS

| 5,889,594 A | 3/1999 | Maekawa | |
|---|---|---|---|
| 2006/0039026 A1* | 2/2006 | Lofthus | H04N 1/00954 358/1.15 |
| 2010/0271656 A1* | 10/2010 | Morales | G06F 3/1263 358/1.15 |
| 2011/0211009 A1* | 9/2011 | Fujinaga | B41J 13/0009 347/16 |
| 2014/0079427 A1 | 3/2014 | Campbell et al. | |
| 2015/0363677 A1 | 12/2015 | Nihei | |
| 2017/0346956 A1* | 11/2017 | Nakamura | G06F 3/1262 |
| 2020/0277155 A1* | 9/2020 | Sano | G03G 15/6552 |
| 2021/0294258 A1 | 9/2021 | Suzuki et al. | |

FOREIGN PATENT DOCUMENTS

| JP | 8-262814 A | 10/1996 |
|---|---|---|
| JP | 2016-21048 A | 2/2016 |
| JP | 2020-140114 A | 9/2020 |
| JP | 2021-147235 A | 9/2021 |

* cited by examiner

*Primary Examiner* — David H Banh
(74) *Attorney, Agent, or Firm* — Merchant & Gould P.C.

(57) ABSTRACT

An image forming apparatus includes an image forming engine, a sheet tray, a discharge tray, a main body including the image forming engine, a feeding path, and a reconveying path configured to reconvey a sheet which an image has been formed on one side thereof to the feeding path, and a controller. The controller is configured to, when successively printing a preceding job whose page count is three or more and a successive job whose page count is two or more in duplex printing, feed a first sheet while printing the preceding job and print an image corresponding to the successive job on one side of the first sheet, and discharge a last sheet of the preceding job in a state where the first sheet which the image has been formed on the one side thereof is in the feeding or reconveying path.

11 Claims, 18 Drawing Sheets

IMAGE FORMING APPARATUS

REFERENCE TO RELATED APPLICATIONS

This application claims priority from Japanese Patent Application No. 2022-109239 filed on Jul. 6, 2022. The entire content of the priority application is incorporated herein by reference.

BACKGROUND ART

Aspects of the present disclosure relate to an image forming apparatus.

In conventional image forming apparatuses capable of executing duplex printing on a sheet, duplex printing is realized by, for example, reversing and refeeding a sheet which printing on one side thereof has been completed to execute printing of the other side.

In the conventional image forming apparatuses, when executing duplex printing, for example, in order to improve printing speed by shortening intervals between conveyed sheets, controls such as a 2416 conveyance control or a 2461 conveyance control in which a printing order of a plurality of pages in a print job is set to an efficient one. In this specification, for example, the 2416 conveyance control indicates a control in which printing is executed in the order of one side of the first sheet (second page of the print job), one side of the second sheet (fourth page of the print job), the other side of the first sheet (first page of the print job), and one side of the third sheet (sixth page of the print job).

DESCRIPTION

As described above, by executing a control such as the 2416 conveyance control or the 2461 conveyance control when executing duplex printing, it is possible to set the printing order to an efficient one and improve the printing speed. However, when successively printing a plurality of print jobs in duplex printing, there is room for further improvement in the printing speed by changing printing order of pages included in the plurality of print jobs without discriminating the print jobs.

At least one aspect of the present disclosure is advantageous to provide an image forming apparatus capable of further improving the printing speed when successively executing a plurality of jobs in duplex printing.

According to aspects of the present disclosure, there is provided an image forming apparatus including an image forming engine configured to form an image on a sheet, a sheet tray configured to support sheets to be fed to the image forming engine, a discharge tray to which a sheet to which an image has been formed by the image forming engine is to be discharged, a main body including the image forming engine, a feeding path configured to feed a sheet from the sheet tray to the image forming engine, and a reconveying path configured to reconvey a sheet which an image has been formed on one side thereof to the feeding path, and a controller. The controller is configured to, when executing a successive duplex printing of successively printing a preceding job whose page count is three or more and a successive job whose page count is two or more in duplex printing, feed a first sheet of the successive job from the sheet tray while printing the preceding job and print an image corresponding to the successive job on one side of the first sheet of the successive job, and discharge a last sheet of the preceding job to the discharge tray in a state where the first sheet of the successive job which the image has been formed on the one side thereof is in the feeding path or the reconveying path.

Hereinafter, an embodiment according to aspects of the present disclosure will be described with reference to the accompanying drawings.

Image Forming Apparatus

Figure 1:
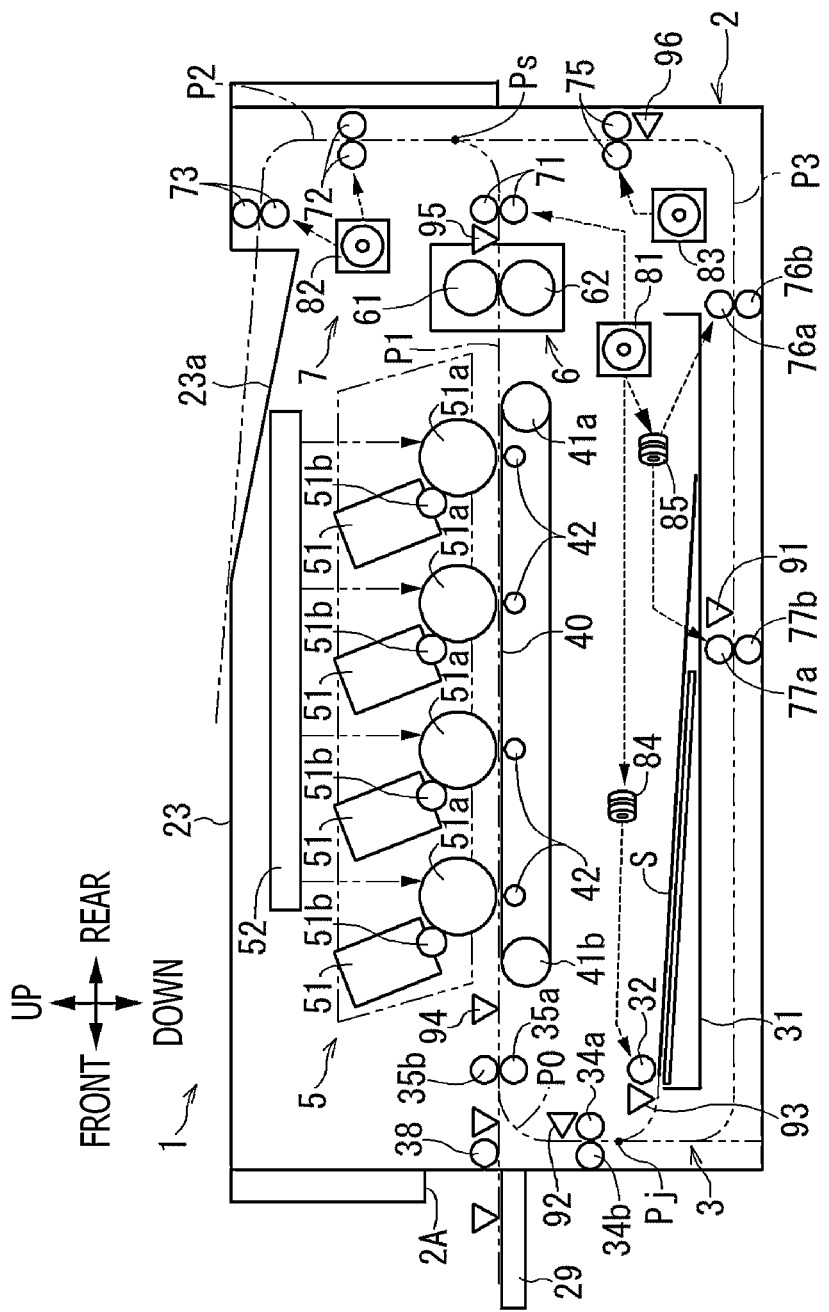
FIG. 1 is a schematic central cross-sectional view of an image forming apparatus.

An image forming apparatus 1 shown in FIG. 1 is an illustrative embodiment according to aspects of the present disclosure. The image forming apparatus 1 is a color laser printer configured to form an image by superimposing toner images of a plurality of colors on a sheet S such as a paper or an OHP sheet by an electrophotographic system. It should be noted that the image forming apparatus 1 may be a monochrome laser printer configured to form an image on a sheet by a toner image of a single color, or an inkjet printer.

In the following description, the left side, right side, back side of the sheet and front side of the sheet in FIG. 1 are defined as "front," "rear," "left" and "right" of the image forming apparatus 1, respectively, and the upper side and lower side in FIG. 1 are defined as "up" and "down" of the image forming apparatus 1, respectively.

The image forming apparatus 1 includes a main body 2, a sheet feeder 3 configured to feed a sheet S, an image forming engine 5 configured to form an image on the conveyed sheet S, and a conveyer 7 configured to convey the sheet S conveyed from the image forming engine 5. The main body 2 is a substantially rectangular parallelepiped box, and accommodates the sheet feeder 3, the image forming engine 5, and the conveyer 7.

A discharge tray 23a recessed to incline downward from the front side toward the rear side is formed on an upper surface 23 of the main body 2. The sheet S to which an image has been formed by the image forming engine 5 is discharged onto the discharge tray 23a. As described above, the main body 2 includes the image forming engine 5 and the discharge tray 23a.

The sheet feeder 3 includes a sheet cassette 31, a first feeding roller 32, a conveying roller 34a, a driven roller 34b disposed to face the conveying roller 34a, a registration roller 35a, and a driven roller 35b disposed to face the registration roller 35a. In the main body 2, a feeding path P0 for feeding the sheet S from the sheet cassette 31 to the image forming engine 5 is formed.

The sheet cassette 31 supports a plurality of sheets S in a stacked state. The sheets S supported by the sheet cassette 31 are fed one by one to the feeding path P0 by the first feeding roller 32. The sheet S fed to the feeding path P0 is conveyed toward the image forming engine 5 by the conveying roller 34a and the registration roller 35a. The registration roller 35a is disposed in the feeding path P0 downstream of the first feeding roller 32 in a sheet conveying direction. The conveying roller 34a is disposed in the feeding path P0 between the first feeding roller 32 and the registration roller 35a.

The main body 2 includes an opening 2A which that is open at a front surface of the main body 2, and a front cover 29 configured to open and close the opening 2A. The opening 2A is open when the front cover 29 is open, and is closed when the front cover 29 is closed.

The sheet feeder 3 includes a second feeding roller 38. When the front cover 29 is open, the sheet S placed on the front cover 29 is fed to the feeding path P0 by the second feeding roller 38. The sheet S fed to the feeding path P0 is conveyed toward the image forming engine 5 by the registration roller 35a.

The image forming engine 5 includes four drum units 51 arranged side by side in the front-rear direction. The four drum units 51 corresponds to black, yellow, magenta, and cyan, respectively. Each drum unit 51 includes a photosensitive drum 51a and a developing roller 51b.

The image forming engine 5 includes a scanner 52 and a fuser 6. The scanner 52 is disposed at an upper portion of the main body 2, and laser lights based on image data pass through corresponding polygon mirrors, lenses, reflecting mirrors and the like to irradiate surfaces of the corresponding photosensitive drums 51a in high-speed scanning. The fuser 6 is disposed downstream of the most downstream photosensitive drum 51a in the sheet conveying direction.

A transfer belt 40 is disposed in the image forming engine 5 below the drum units 51. The transfer belt 40 is looped between a drive roller 41a and a driven roller 41b disposed in front of the drive roller 41a. Transfer rollers 42 of the image forming engine 5 are disposed to oppose the corresponding photosensitive drums 51a across the transfer belt 40.

In the image forming engine 5, the photosensitive drums 51a uniformly charged by conventionally-known chargers are selectively exposed by the scanner 52. By this exposure, electric charges are selectively removed from the surfaces of the photosensitive drums 51a, thereby electrostatic latent images are formed on the surfaces of the photosensitive drums 51a.

A developing bias is applied to the developing roller 51b, and when the electrostatic latent image formed on the photosensitive drum 51a faces the developing roller 51b, toner is supplied from the developing roller 51b to the electrostatic latent image due to a potential difference between the electrostatic latent image and the developing roller 51b. A toner image is thereby formed on the surface of the photosensitive drum 51a.

When the sheet S conveyed toward the image forming engine 5 is conveyed onto the transfer belt 40, the sheet S is conveyed by the transfer belt 40 and sequentially passes between the transfer belt 40 and the photosensitive drums 51a. The toner images on the surfaces of the photosensitive drums 51a are transferred onto the sheet S by a transfer bias, which is a voltage applied to the transfer roller 42, when the sheet S faces the sheet S.

The sheet S onto which the toner images have been transferred is conveyed to the fuser 6. The fuser 6 includes a heating roller 61 configured to heat the sheet S, and a pressure roller 62 disposed to face the heating roller 61. The fuser 6 fixes the toner images transferred to the sheet S. The sheet S conveyed to the fuser 6 passes between the heating roller 61 and the pressure roller 62 which are in pressure contact with each other, whereby the toner images are thermally fixed.

The sheet S onto which the toner images have been thermally fixed is conveyed to downstream of the image forming engine 5 by the conveyer 7. The conveyer 7 includes a conveying path P1, a discharge path P2, and a reconveying path P3. The conveying path P1 is a path to which the sheet S conveyed from the image forming engine 5 is to be conveyed. The discharge path P2 is a path branched from the conveying path P1 at a branch point Ps to convey the sheet S to the discharge tray 23a. The reconveying path P3 is a path branched from the conveying path P1 and the discharge path P2 at the branch point Ps to reconvey the sheet S which an image has been formed on one side thereof by the image forming engine 5 to the feeding path P0.

The discharge path P2 extends upward from the branch point Ps and then bends forward. The reconveying path P3 extends downward from the branch point Ps and then extends forward below the sheet cassette 31, further bends upward in front of the sheet cassette 31, and joins with the feeding path P0 at a junction point Pj. The reconveying path P3 is disposed below the sheet cassette 31, so that a path length can be secured and the degree of freedom in keeping the sheet S in the reconveying path P3 can be increased.

The conveying roller 34a is disposed in the feeding path P0 between the first feeding roller 32 and the registration roller 35a and downstream of the junction point Pj in the sheet conveying direction.

A post-fixing roller pair 71 configured to convey the sheet is provided in the conveying path P1 downstream of the fuser 6 in the sheet conveying direction. A discharge roller pair 73 configured to convey the sheet S is provided at the downstream end of the discharge path P2 in the sheet conveying direction. An intermediate discharge roller pair 72 configured to convey the sheet S is provided in the discharge path P2 upstream of the discharge roller pair 73 in the sheet conveying direction.

An intermediate reconveying roller pair 75 configured to convey the sheet S is disposed at an end portion of the reconveying path P3 on the side of the branch point Ps. A first reconveying roller 76a configured to convey the sheet S, a driven roller 76b opposed to the first reconveying roller 76a, a second reconveying roller 77a configured to convey the sheet S, and a driven roller 77b opposed to the second reconveying roller 77a are disposed in the reconveying path P3 downstream of the intermediate reconveying roller pair 75 in the sheet conveying direction. The second reconveying roller 77a and the driven roller 77b are disposed downstream of the first reconveying roller 76a and the driven roller 76b in the sheet conveying direction. The first reconveying roller 76a and the second reconveying roller 77a convey the sheet S toward the feeding path P0.

The main body 2 includes a first motor 81, a second motor 82, and a third motor 83. The first motor 81 drives the first feeding roller 32, the post-fixing roller pair 71, the first reconveying roller 76a, and the second reconveying roller 77a.

A first electromagnetic clutch 84 is interposed between the first motor 81 and the first feeding roller 32. Transmission and cutoff of driving force from the first motor 81 to the first feeding roller 32 can be switched by turning the first electromagnetic clutch 84 on or off.

A second electromagnetic clutch 85 is interposed between the first motor 81 and the first reconveying roller 76a and the second reconveying roller 77a. Transmission and cutoff of driving force from the first motor 81 to the first reconveying roller 76a and the second reconveying roller 77a can be switched by turning the second electromagnetic clutch 85 on or off.

Specifically, when turned on, the second electromagnetic clutch 85 switches to a transmitting state for transmitting the driving force from the first motor 81 to the first reconveying roller 76a and the second reconveying roller 77a, and when turned off, the second electromagnetic clutch 85 switches to a cutoff state for cutting off the transmission of the driving force from the first motor 81 to the first reconveying roller 76a and the second reconveying roller 77a.

As the clutch configured to switch transmission and cutoff of the driving force from the first motor 81, a clutch mechanism configured to switch transmission and cutoff of the driving force by a mechanical structure can be used. However, by using an electromagnetic clutch such as the first electromagnetic clutch 84 and the second electromagnetic clutch 85, it is possible to switch transmission and cutoff of the driving force without using a complicated mechanism.

The second motor 82 drives the discharge roller pair 73 and the intermediate discharge roller pair 72. The discharge roller pair 73 and the intermediate discharge roller pair 72 are configured so that the rotation directions thereof can be switched between a forward rotation direction and a reverse rotation direction by the second motor 82. When rotated in the forward rotation direction, the discharge roller pair 73 and the intermediate discharge roller pair 72 convey the sheet S toward the discharge tray 23a, and when rotated in the reverse rotation direction, the discharge roller pair 73 and the intermediate discharge roller pair 72 convey the sheet S toward the reconveying path P3. Thus, the conveying direction of the sheet S in the discharge path P2 can be reversed.

The third motor 83 drives the intermediate reconveying roller pair 75. The intermediate reconveying roller pair 75 conveys the sheet S, which has been conveyed toward the reconveying path P3 by the intermediate discharge roller pair 72, downstream in the sheet conveying direction along the reconveying path P3. The sheet S conveyed by the intermediate reconveying roller pair 75 is further conveyed downstream in the sheet conveying direction along the reconveying path P3 by the first reconveying roller 76a, the driven roller 76b, the second reconveying roller 77a, and the driven roller 77b, and reaches the feeding path P0.

The image forming apparatus 1 includes a first sheet sensor 91, a second sheet sensor 92, a third sheet sensor 93, a fourth sheet sensor 94, a fifth sheet sensor 95, and a sixth sheet sensor 96.

The first sheet sensor 91 is disposed in the reconveying path P3 between the first reconveying roller 76a and the second reconveying roller 77a. The second sheet sensor 92 is disposed in the feeding path P0 between the conveying roller 34a and the registration roller 35a. The third sheet sensor 93 is disposed in the feeding path P0 between the first feeding roller 32 and the registration roller 35a. More specifically, the third sheet sensor 93 is disposed in the feeding path P0 between the first feeding roller 32 and the junction point Pj.

The fourth sheet sensor 94 is disposed in the feeding path P0 between the registration roller 35a and the image forming engine 5. The fifth sheet sensor 95 is disposed in the conveying path P1 between the fuser 6 and the post-fixing roller pair 71. The sixth sheet sensor 96 is disposed in the reconveying path P3 between the intermediate reconveying roller pair 75 and the first reconveying roller 76a.

Figure 2:
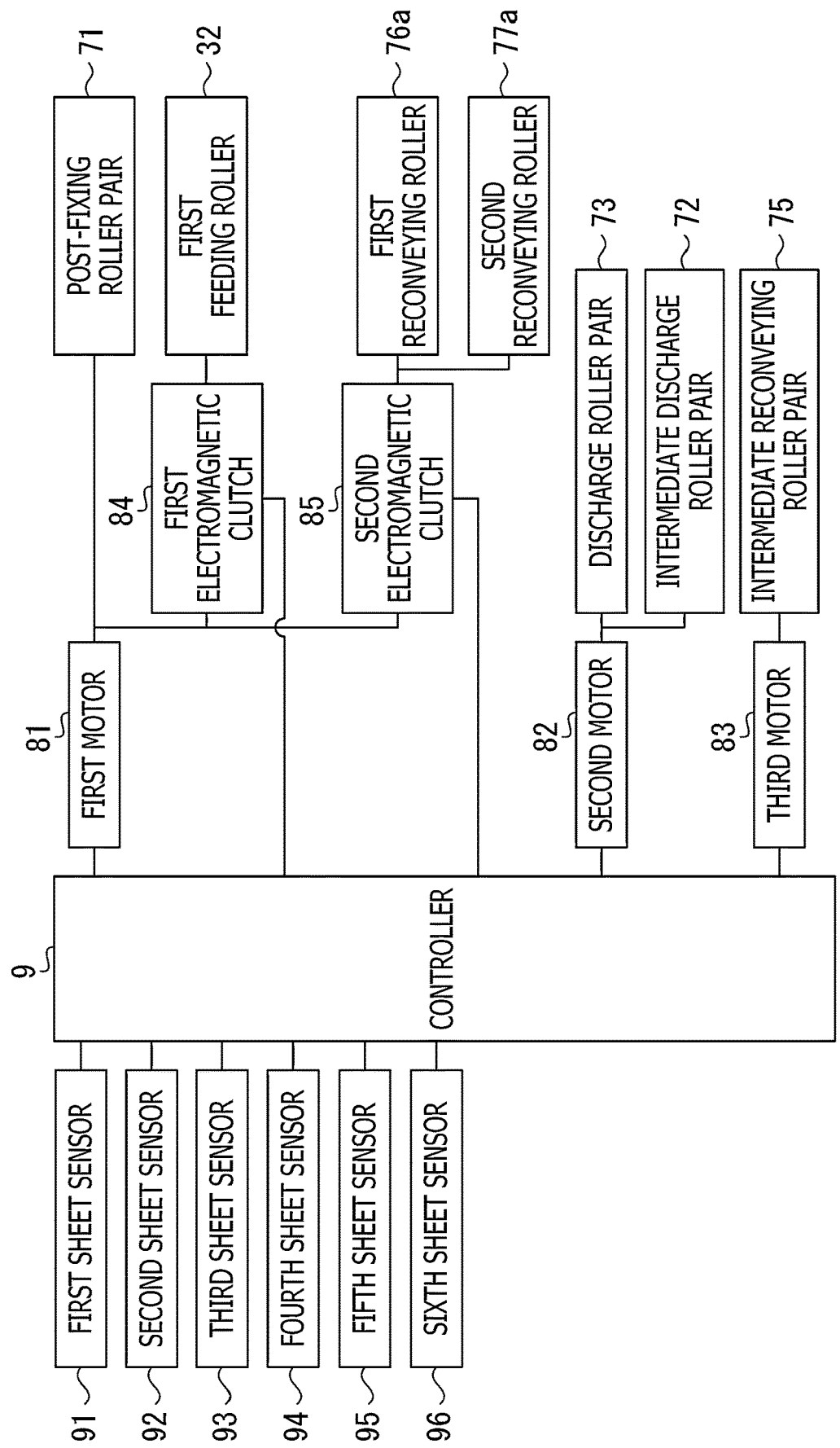
FIG. 2 is a block diagram of the image forming apparatus.

As shown in FIG. 2, the image forming apparatus 1 includes a controller 9. The first motor 81, the second motor 82, the third motor 83, the first electromagnetic clutch 84, and the second electromagnetic clutch 85 are connected to the controller 9. The controller 9 includes, for example, a CPU, a ROM, a RAM, an EEPROM, and an ASIC. The ROM stores programs for controlling operations executed by the CPU. The RAM is used as a storage area for temporarily storing data, signals, and the like used when the CPU executes the programs, or as a data processing work area. The EEPROM stores settings, flags, and the like that should be retained even after the power is turned off. The first motor 81, the second motor 82, the third motor 83, the first electromagnetic clutch 84, and the second electromagnetic clutch 85 are connected to the ASIC. The ASIC generates drive signals for driving the first motor 81, the second motor 82, the third motor 83, the first electromagnetic clutch 84, and the second electromagnetic clutch 85, and controls the motors and the electromagnetic clutches based on the drive signals. The first sheet sensor 91, the second sheet sensor 92, the third sheet sensor 93, the fourth sheet sensor 94, the fifth sheet sensor 95, and the sixth sheet sensor 96 are connected to the controller 9.

The controller 9 controls the first motor 81 to switch rotation and stop of the post-fixing roller pair 71. The controller 9 controls the first motor 81 and the first electromagnetic clutch 84 to switch rotation and stop of the first feeding roller 32. The controller 9 controls the first motor 81 and the second electromagnetic clutch 85 to switch rotation and stop of the first reconveying roller 76a and the second reconveying roller 77a.

The controller 9 controls the second motor 82 to switch the rotational direction of the discharge roller pair 73 and the intermediate discharge roller pair 72, and to switch rotation and stop of the discharge roller pair 73 and the intermediate discharge roller pair 72. The controller controls the third motor 83 to switch rotation and stop of the intermediate reconveying roller pair 75.

In the image forming apparatus 1 configured as described above, when executing duplex printing for executing printing on both sides of the sheet S, the printing speed can be improved by causing the controller 9 to execute a high-speed conveyance control for printing on the sheet S in a printing order in which intervals between the conveyed sheets S can be shortened.

For example, as the high-speed conveyance control, the controller 9 can execute a 2416 conveyance control in which printing is executed in the order of one side of the first sheet (second page of a print job), one side of the second sheet (fourth page of the print job), the other side of the first sheet (first page of the print job), and one side of the third sheet (sixth page of the print job). As the high-speed conveyance control, the controller 9 can also execute the 2461 conveyance control in which printing is executed in the order of one side of the first sheet (second page of a print job), one side of the second sheet (fourth page of the print job), one side of the third sheet (sixth page of the print job), and the other side of the first sheet (first page of the print job).

As described above, by executing the high-speed conveyance control when executing duplex printing of a job on the sheet S, it is possible to set the printing order to an efficient one to improve the printing speed. The job is a print command input to the image forming apparatus 1 and includes, for example, data of images to be printed on the sheet S, a page count, and print mode information such as color or monochrome printing and single-sided or duplex printing. The job is input to the image forming apparatus 1 via a network from an external device such as a PC or a mobile terminal connected to the image forming apparatus 1, or is generated by the image forming apparatus 1 using a user interface such as a touch panel provided to the image forming apparatus 1. Printing the job on the sheets S specifically means printing one or more images corresponding to one or more pages represented by the image data included in the job on one or more sides of the sheets S, respectively, based on settings such as the print mode information included in the job, and by printing the job on the sheets S, one or more images corresponding to one or more pages of the job are formed on one or more sides of the sheets S, respectively.

As described above, it is possible to improve the printing speed by executing the high-speed conveyance control when executing duplex printing of a job on the sheets S. However, when successively printing a plurality of jobs in duplex printing, there is room for further improvement in the printing speed by changing printing order of pages included in the plurality of print jobs without discriminating the print jobs.

Therefore, the controller 9 is configured to execute conveyance control in which, when executing successive duplex printing in which a preceding job whose page count is three or more and a successive job whose page count is two or more are successively printed in duplex printing, the first sheet S of the successive job is fed from the sheet cassette 31 while executing printing of the preceding job, an image of the successive job is printed on one side of the first sheet S of the successive job, and the last sheet S of the preceding job is discharged on the discharge tray 23a in a state where the first sheet of the successive job which the image has been formed on one side thereof is in the feeding path P0 or the reconveying path P3.

In this case, the total page count of the preceding job may be odd or even as long as it is three or more, and the total page count of the successive job may be odd or even as long as it is two or more.

By executing such conveyance control, a conveyance interval of the sheets S to which the preceding job and the successive job are to be printed can be reduced, and the printing speed can be improved.

Conveyance Control

Hereinafter, conveyance control of the sheets S during duplex printing executed by the controller 9 will be described. In particular, the 2416 conveyance control, in the successive duplex printing of the preceding job whose page count is three or more and the successive job whose page count is two or more, of feeding the first sheet S of the successive job from the sheet cassette 31 while printing the preceding job, printing an image of the successive job on one side of the first sheet S of the successive job, and discharging the last sheet S of the preceding job on the discharge tray 23a in a state where the first sheet S of the successive job which the image has been printed on one side thereof is in the feeding path P0 or the reconveying path P3 will be described.

Hereinafter, the 2416 conveyance control in a case where the page count of the preceding job is five and the page count of the successive job is five are successively printed will be described.

The preceding job is the first one of a plurality of jobs that are successively printed, and the successive job is a job that follows the preceding job and whose printing is started after the preceding job started printing.

The sheet S to be first fed from the sheet cassette 31 among the sheets S to which the preceding job is to be printed is referred to as a first sheet AS1, the sheet S to be fed from the sheet cassette 31 after the first sheet AS1 is referred to as a second sheet AS2, and the sheet S to be fed from the sheet cassette 31 after the second sheet AS2 is referred to as a third sheet AS3.

The first-fed sheet S, among the sheets S to which the preceding job is to be printed, which an image corresponding to the second page of the preceding job is to be printed on one side thereof is referred to as a first sheet AS1-2, the first-fed sheet S which an image corresponding to the first page of the preceding job is to be printed on the other side thereof is referred to as a first sheet AS1-1, the second-fed sheet S which an image corresponding to the fourth page of the preceding job is to be printed on one side thereof is referred to as a second sheet AS2-2, the second-fed sheet S which an image corresponding to the third page of the preceding job is to be printed on the other side thereof is referred to as a second sheet AS2-1, and a third-fed sheet which an image corresponding to the fifth page of the preceding job is to be printed on one side thereof is referred to as a third sheet AS3-2.

The sheet S to be first fed from the sheet cassette 31 among the sheets S to which the successive job is to be printed is referred to as the first sheet BS1, the sheet S to be fed from the sheet cassette 31 after the first sheet BS1 is referred to as the second sheet BS2, and the sheet S to be fed from the sheet cassette 31 after the second sheet BS2 is referred to as the third sheet BS3.

The first-fed sheet S, among the sheets S to which the successive job is to be printed, which an image corresponding to the second page of the successive job is to be printed on one side thereof is referred to as a first sheet BS1-2, the first-fed sheet S which an image corresponding to the first page of the successive job is to be printed on the other side thereof is referred to as a first sheet BS1-1, the second-fed sheet S which an image corresponding to the fourth page of the successive job is to be printed on one side thereof is referred to as a second sheet BS2-2, the second-fed sheet S which an image corresponding to the third page of the successive job is to be printed on the other side thereof is referred to as a second sheet BS2-1, and the third-fed sheet which an image corresponding to the fifth page of the successive job is to be printed on one side thereof is referred to as a third sheet BS3-2.

The first sheet AS1-2 changes to the first sheet AS1-1 when the conveying direction is reversed in the discharge path P2. The second sheet AS2-2 changes to the second sheet AS2-1 when the conveying direction is reversed in the discharge path P2. The first sheet BS1-2 changes to the first sheet BS1-1 when the conveying direction is reversed in the discharge path P2. The second sheet BS2-2 changes to the second sheet BS2-1 when the conveying direction is reversed in the discharge path P2.

Figure 3:
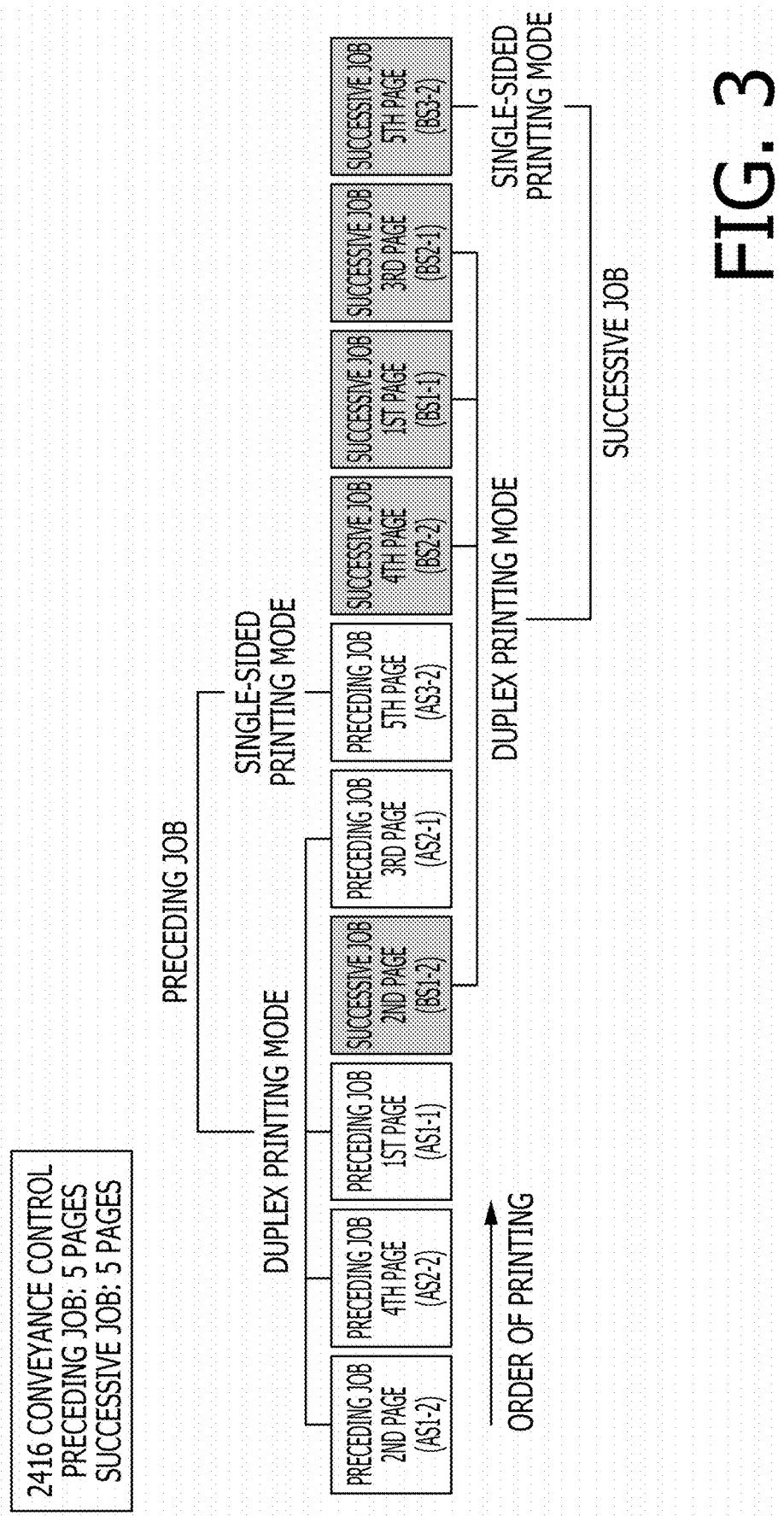
FIG. 3 is a diagram showing a printing order in a 2416 conveyance control.

As shown in FIG. 3, in the conveyance control by the controller 9 of the present embodiment, printing on the sheets S is executed in the order of the first sheet AS1-2 (the second page of the preceding job), the second sheet AS2-2 (the fourth page of the preceding job), the first sheet AS1-1 (the first page of the preceding job), the first sheet BS1-2 (the second page of the successive job), the second sheet AS2-1 (the third page of the preceding job), the third sheet AS3-2 (the fifth page of the preceding job), the second sheet BS2-2 (the fourth page of the successive job), the first sheet BS1-1 (the first page of the successive job), the second sheet BS2-1 (the third page of the successive job), and the third sheet BS3-2 (the fifth page of the successive job).

In this case, printing of the preceding job whose page count is five is executed in the order of the image corresponding to the second page of the preceding job on the first sheet AS1-2, the image corresponding to the fourth page of the preceding job on the second sheet AS2-2, the image corresponding to the first page of the preceding job on the first sheet AS1-1, the image corresponding to the third page of the preceding job on the second sheet AS2-1, and the image corresponding to the fifth page of the preceding job on the third sheet AS3-2.

Similarly, printing of the successive job whose page count five is executed in the order of the image corresponding to the second page of the successive job on the first sheet BS1-2, the image corresponding to the fourth page of the successive job on the second sheet BS2-2, the image corresponding to the first page of the successive job on the first sheet BS1-1, the image corresponding to the third page of the successive job on the second sheet BS2-1, and the image corresponding to the fifth page of the successive job on the third sheet BS3-2.

Figure 4A:
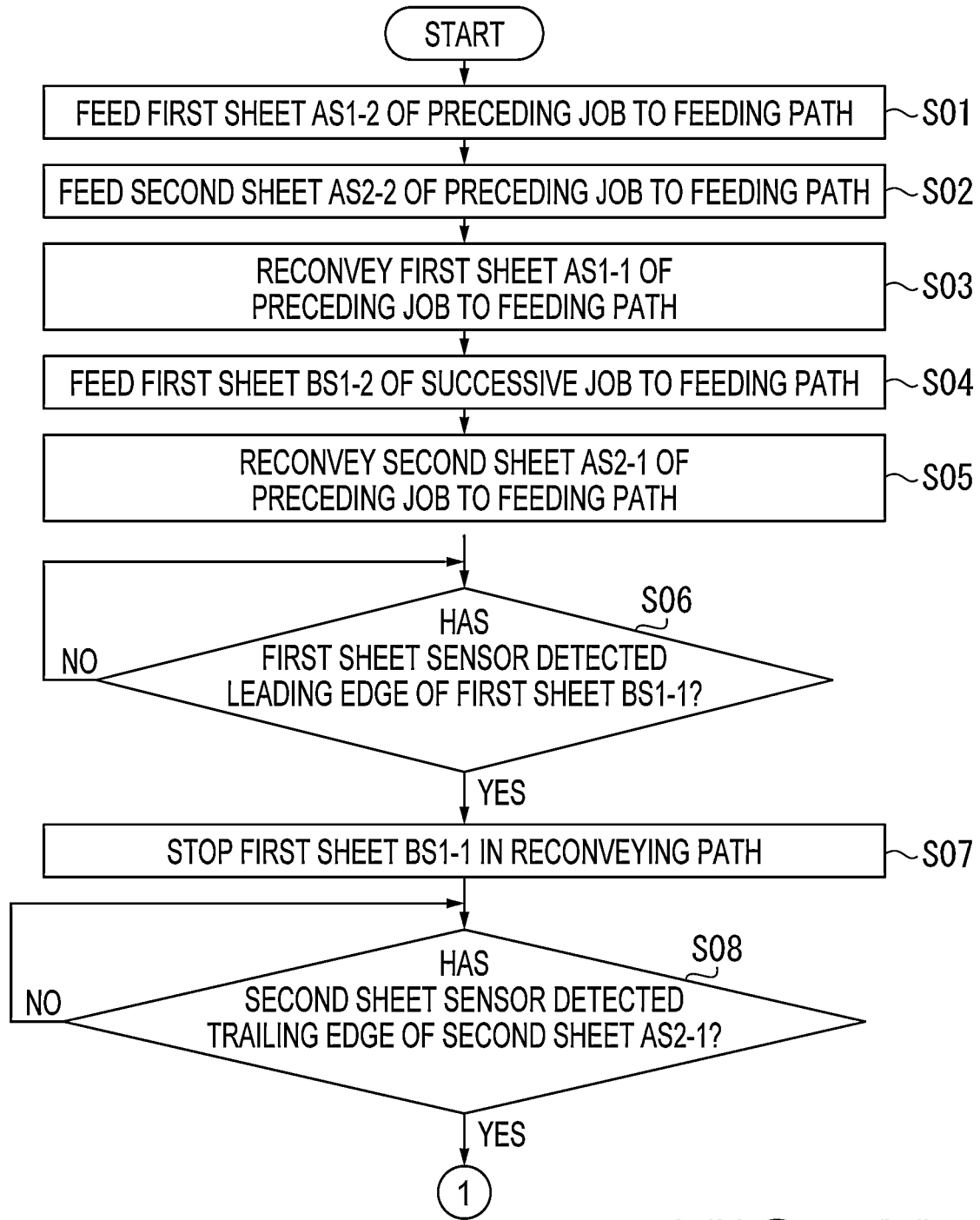
FIG. 4A is a flowchart of a conveyance control.
Figure 4B:
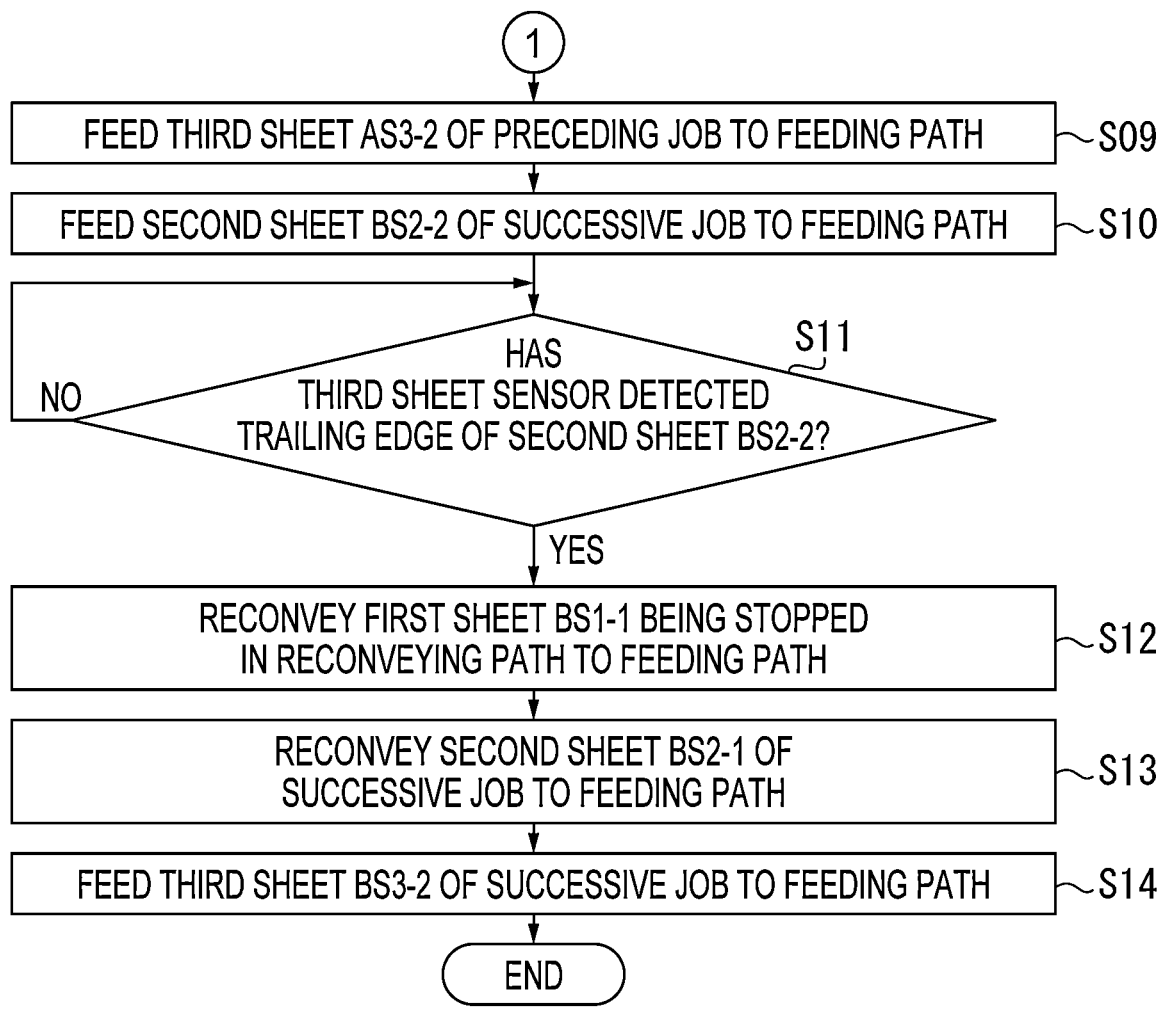
FIG. 4B is a continuation of FIG. 4A.
Figure 5:
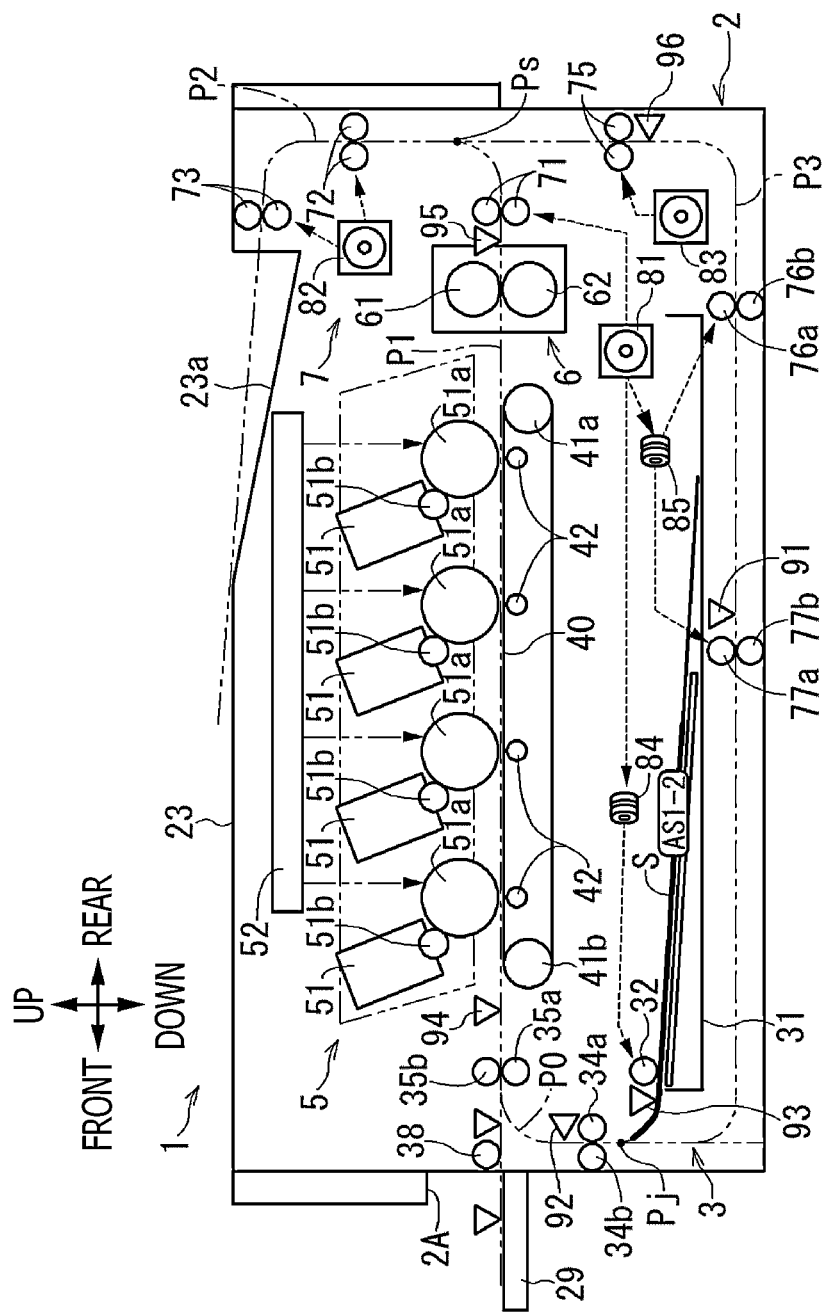
FIG. 5 is a schematic central cross-sectional view of the image forming apparatus in a state where a first sheet of a preceding job is fed to a feeding path.

FIGS. 4A and 4B show a flowchart of the conveyance control. The conveyance control is started when a print instruction is input to the controller 9. As shown in FIG. 5, when the conveyance control is started, the controller 9 feeds the first sheet AS1-2 supported by the sheet cassette 31 to the feeding path P0 (step S01). In this case, the controller 9 drives the first motor 81, turns on the first electromagnetic clutch 84, and transmits the driving force from the first motor 81 to the first feeding roller 32, thereby causing the first feeding roller 32 to rotate.

The first sheet AS1-2 supported by the sheet cassette 31 is fed to the feeding path P0 by the first feeding roller 32. The first sheet AS1-2 fed to the feeding path P0 is conveyed to the image forming engine 5 by the conveying roller 34a and the registration roller 35a. In the process of conveying the first sheet AS1-2 to the image forming engine 5, when the leading edge of the first sheet AS1-2 reaches the position of the fourth sheet sensor 94, the fourth sheet sensor 94 switches from an off state to an on state, and the fourth sheet sensor 94 transmits a detection signal to the controller 9. The controller 9 detects the first sheet AS1-2 based on the detection signal received from the fourth sheet sensor 94. When the trailing edge of the first sheet AS1-2 passes the fourth sheet sensor 94, the fourth sheet sensor 94 switches from the on state to the off state, and the fourth sheet sensor 94 transmits a detection signal to the controller 9. The controller 9 detects that the first sheet AS1-2 has passed the fourth sheet sensor 94 based on the detection signal received from the fourth sheet sensor 94.

After the image corresponding to the second page of the preceding job is printed on one side of the first sheet AS1-2 in the image forming engine 5, the first sheet AS1-2 is conveyed to the conveying path P1. When a leading edge of the first sheet AS1-2 conveyed to the conveying path P1 reaches the position of the fifth sheet sensor 95, the fifth sheet sensor 95 switches from the off state to the on state, and the fifth sheet sensor 95 transmits a detection signal to the controller 9. The controller 9 detects the first sheet AS1-2 based on the detection signal received from the fifth sheet sensor 95. The first sheet AS1-2 conveyed along the conveying path P1 is further conveyed to the discharge path P2 through the branch point Ps. The first sheet AS1-2 is conveyed toward the discharge tray 23a by the intermediate discharge roller pair 72 and the discharge roller pair 73 rotating in the forward rotation direction. When the trailing edge of the first sheet AS1-2 conveyed along the discharge path P2 passes the fifth sheet sensor 95, the fifth sheet sensor 95 switches from the on state to the off state, and the fifth sheet sensor 95 transmits a detection signal to the controller 9. The controller 9 detects that the first sheet AS1-2 has passed the fifth sheet sensor 95 based on the received detection signal from the fifth sheet sensor 95.

Figure 6:
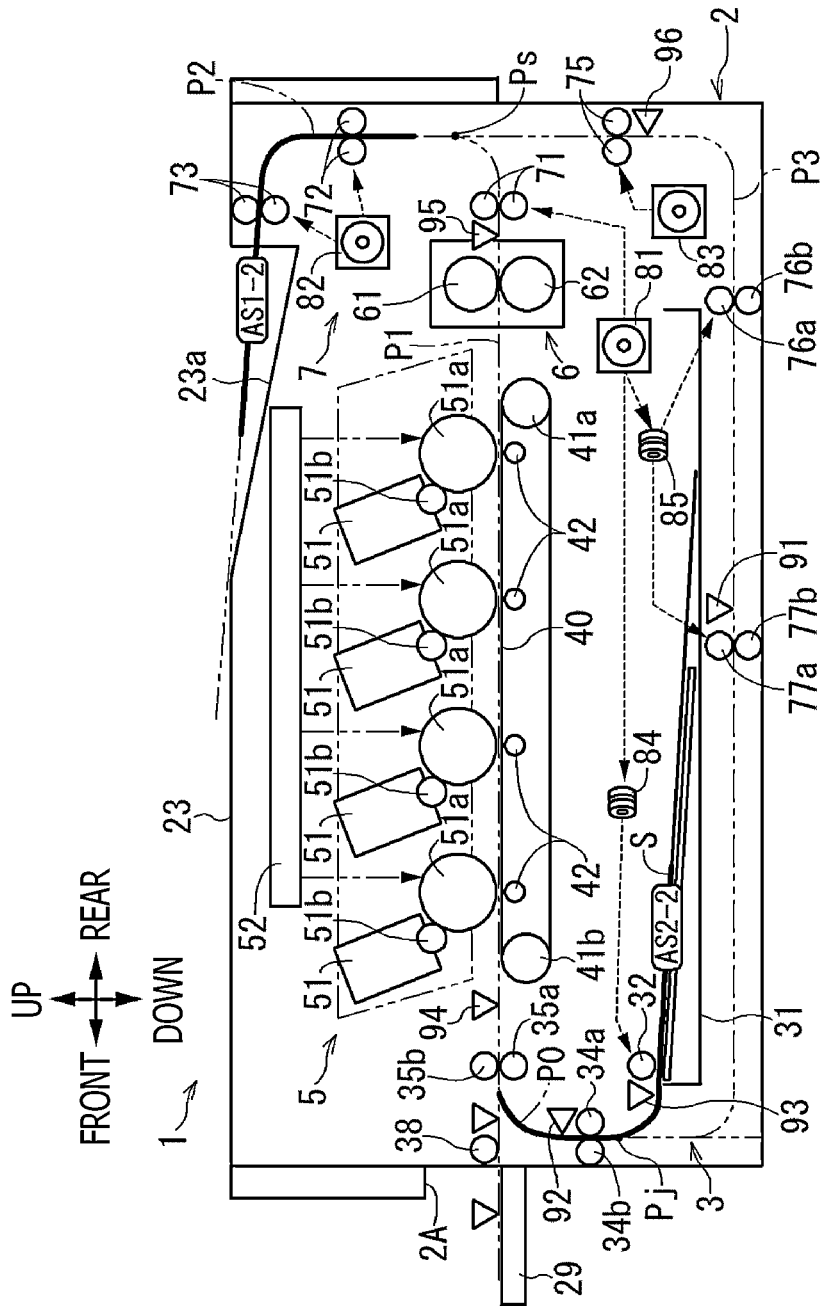
FIG. 6 is a schematic central cross-sectional view of the image forming apparatus in a state where a second sheet of the preceding job is fed to the feeding path.

As shown in FIG. 6, after feeding the first sheet AS1-2 in step S01, the controller 9 causes the first feeding roller 32 to feed the second sheet AS2-2 supported by the sheet cassette 31 to the feeding path P0 (step S02). In this case, for example, the controller 9 can start feeding the second sheet AS2-2 at a timing at which a predetermined time has elapsed after detecting that the trailing edge of the first sheet AS1-2 has passed the fifth sheet sensor 95.

When a predetermined time has elapsed after the controller 9 has detected that the trailing edge of the first sheet AS1-2 has passed the fifth sheet sensor 95, the controller 9 switches the rotation direction of the second motor 82 from the forward rotation direction to the reverse rotation direction. As a result, the rotation directions of the intermediate discharge roller pair 72 and the discharge roller pair 73 are switched from the forward rotation direction to the reverse rotation direction, thereby the conveying direction of the first sheet AS1-2 is reversed and the first sheet AS1-2 is conveyed toward the reconveying path P3. The first sheet AS1-2 changes to the first sheet AS1-1 when the conveying direction is reversed.

Figure 7:
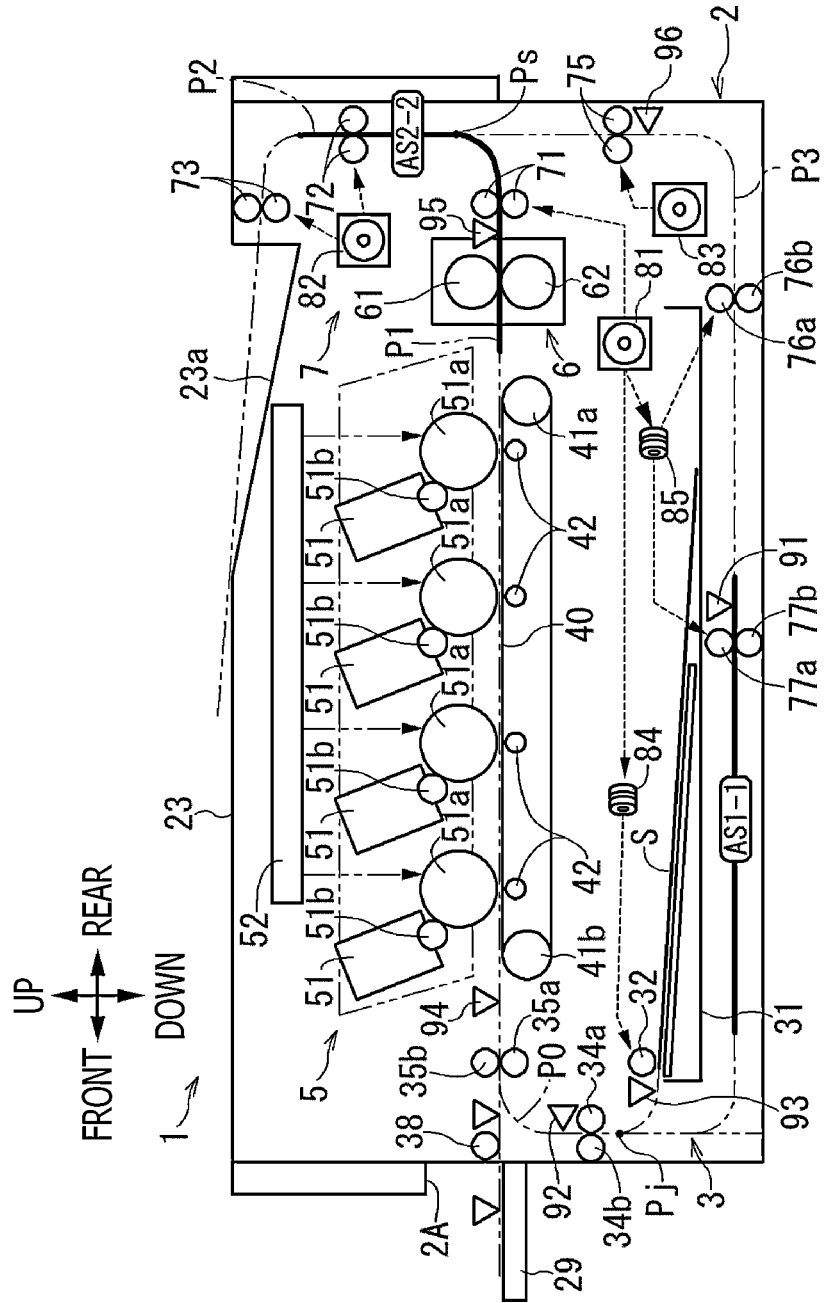
FIG. 7 is a schematic central cross-sectional view of the image forming apparatus in a state where the first sheet of the preceding job is conveyed along a reconveying path and the second sheet of the preceding job is conveyed to the discharge path.

As shown in FIG. 7, the first sheet AS1-1 is conveyed to the reconveying path P3 through the branch point Ps. The first sheet AS1-1 is conveyed along the reconveying path P3 by the intermediate reconveying roller pair 75, and further conveyed along the reconveying path P3 by the first reconveying roller 76a and the second reconveying roller 77a.

In this case, the controller 9 starts driving the third motor 83 at the timing when the rotation direction of the second motor 82 is switched from the forward rotation direction to the reverse rotation direction to rotate the intermediate reconveying roller pair 75. When the leading edge of the first sheet AS1-1 reaches the sixth sheet sensor 96, the sixth sheet sensor 96 switches from the off state to the on state, and the sixth sheet sensor 96 transmits a detection signal to the controller 9. The controller 9 detects that the leading edge of the first sheet AS1-1 has reached the sixth sheet sensor 96 based on the detection signal received from the sixth sheet sensor 96. For example, after a predetermined time period has elapsed since the detection of the leading edge of the first sheet AS1-1 reaching the sixth sheet sensor 96, the controller 9 turns on the second electromagnetic clutch 85 to rotate the first reconveying roller 76a and the second reconveying roller 77a.

When the leading edge of the first sheet AS1-1 conveyed along the reconveying path P3 reaches the first sheet sensor 91, the first sheet sensor 91 switches from the off state to the on state, and the first sheet sensor 91 transmits a detection signal to the controller 9. The controller 9 detects that the leading edge of the first sheet AS1-1 has reached the first sheet sensor 91 based on the detection signal received from the first sheet sensor 91. When the trailing edge of the first sheet AS1-1 conveyed along the reconveying path P3 passes the first sheet sensor 91, the first sheet sensor 91 switches from the on state to the off state, and the first sheet sensor 91 transmits a detection signal to the controller 9. The controller 9 detects that the first sheet AS1-1 has passed the first sheet sensor 91 based on the detection signal received from the first sheet sensor 91.

The second sheet AS2-2 fed to the feeding path P0 in step S02 is conveyed to the image forming engine 5, and after the image corresponding to the fourth page of the preceding job is printed on one side in the image forming engine 5, the second sheet AS2-2 is conveyed to the conveying path P1. The second sheet AS2-2 is further conveyed to the discharge path P2 through the branch point Ps. The conveyance of the second sheet AS2-2 fed to the feeding path P0 to the image forming engine 5 and the conveyance of the second sheet AS2-2 from the conveying path P1 to the discharge path P2 are executed in the same manner as in the case of the first sheet AS1-2. The same also applies to the subsequent sheets S.

Figure 8:
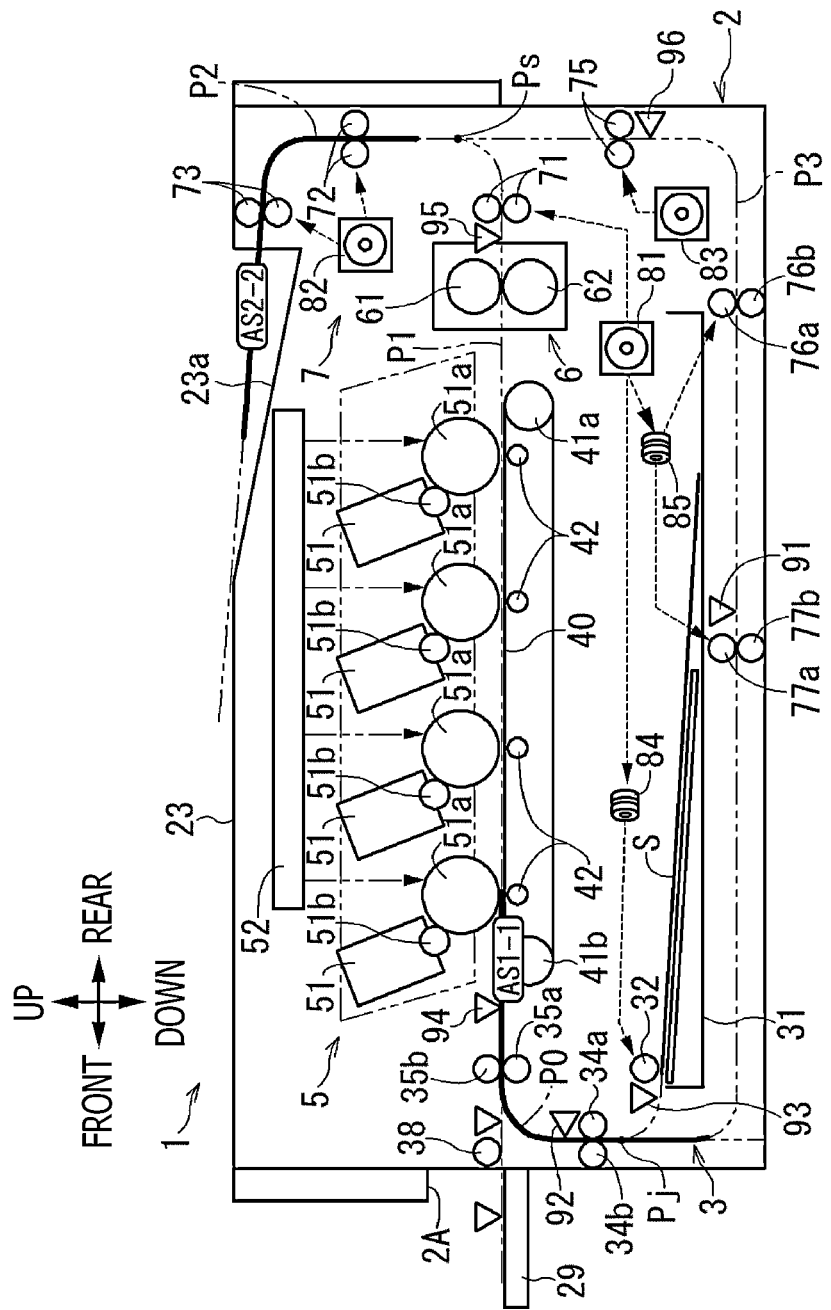
FIG. 8 is a schematic central cross-sectional view of the image forming apparatus in a state where the first sheet of the preceding job is fed to the feeding path.

As shown in FIG. 8, the first sheet AS1-1 conveyed along the reconveying path P3 is reconveyed from the reconveying path P3 to the feeding path P0 through the junction point Pj (step S03). The first sheet AS1-1 is conveyed to the feeding path P0 after the second sheet AS2-2 is fed to the feeding path P0 in step S02.

In this case, when there is a possibility that the first sheet AS1-1 interferes with the second sheet AS2-2 located downstream in the sheet conveying direction when the first sheet AS1-1 is reconveyed to the feeding path P0, the controller 9 may reduce the conveying speed of the first sheet AS1-1 when conveying along the reconveying path P3 or may cause to stop the first sheet AS1-1 in the reconveying path P3 for a predetermined time period. There is a possibility that the first sheet AS1-1 and the second sheet AS2-2 interfere with each other when, for example, the feeding timing of the second sheet AS2-2 from the sheet cassette 31 is delayed.

Similarly to the case of the first sheet AS1-2, the second sheet AS2-2 conveyed along the discharge path P2 is conveyed toward the reconveying path P3 by reversing the conveying direction. The same also applies to the subsequent sheets S. The second sheet AS2-2 changes to the second sheet AS2-1 when the conveying direction is reversed.

Similarly to the case of the first sheet AS1-1, the second sheet AS2-1 switched from the second sheet AS2-2 due to the reversal of the conveying direction is conveyed along the reconveying path P3 by the intermediate reconveying roller pair 75, and further conveyed along the reconveying path P3 by the first reconveying roller 76a and the second reconveying roller 77a. The same also applies to the subsequent sheets S.

Figure 9:
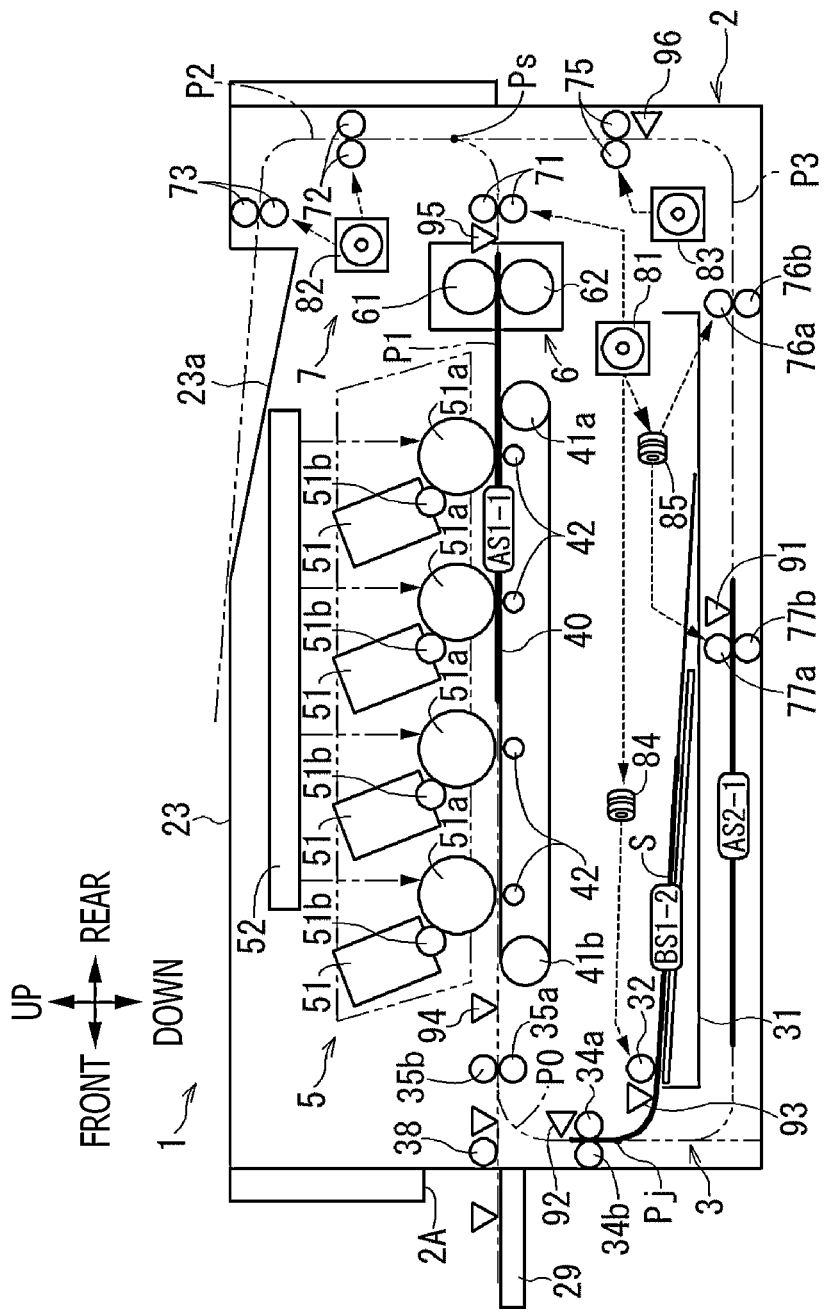
FIG. 9 is a schematic central cross-sectional view of the image forming apparatus in a state where a first sheet of a successive job is fed to the feeding path.

As shown in FIG. 9, after the first sheet AS1-1 is reconveyed to the feeding path P0 in step S03, the controller 9 feeds the first sheet BS1-2 from the sheet cassette 31 to the feeding path P0 (step S04). In this case, for example, the controller 9 starts feeding the first sheet BS1-2 after a predetermined time period has elapsed after detecting that the trailing edge of the first sheet AS1-1 passed the second sheet sensor 92. The method of the sheet detection by the second sheet sensor 92 is the same as that of the other sheet sensors. The controller 9 may alternatively start feeding the first sheet BS1-2 after a predetermined time has elapsed after detecting that the trailing edge of the first sheet AS1-1 passed the first sheet sensor 91.

The first sheet AS1-1 conveyed to the feeding path P0 is conveyed to the image forming engine 5, and the image corresponding to the first page of the preceding job is printed on the other side. At the time when the first sheet BS1-2 is fed to the feeding path P0, the second sheet AS2-1 is in the reconveying path P3.

Figure 10:
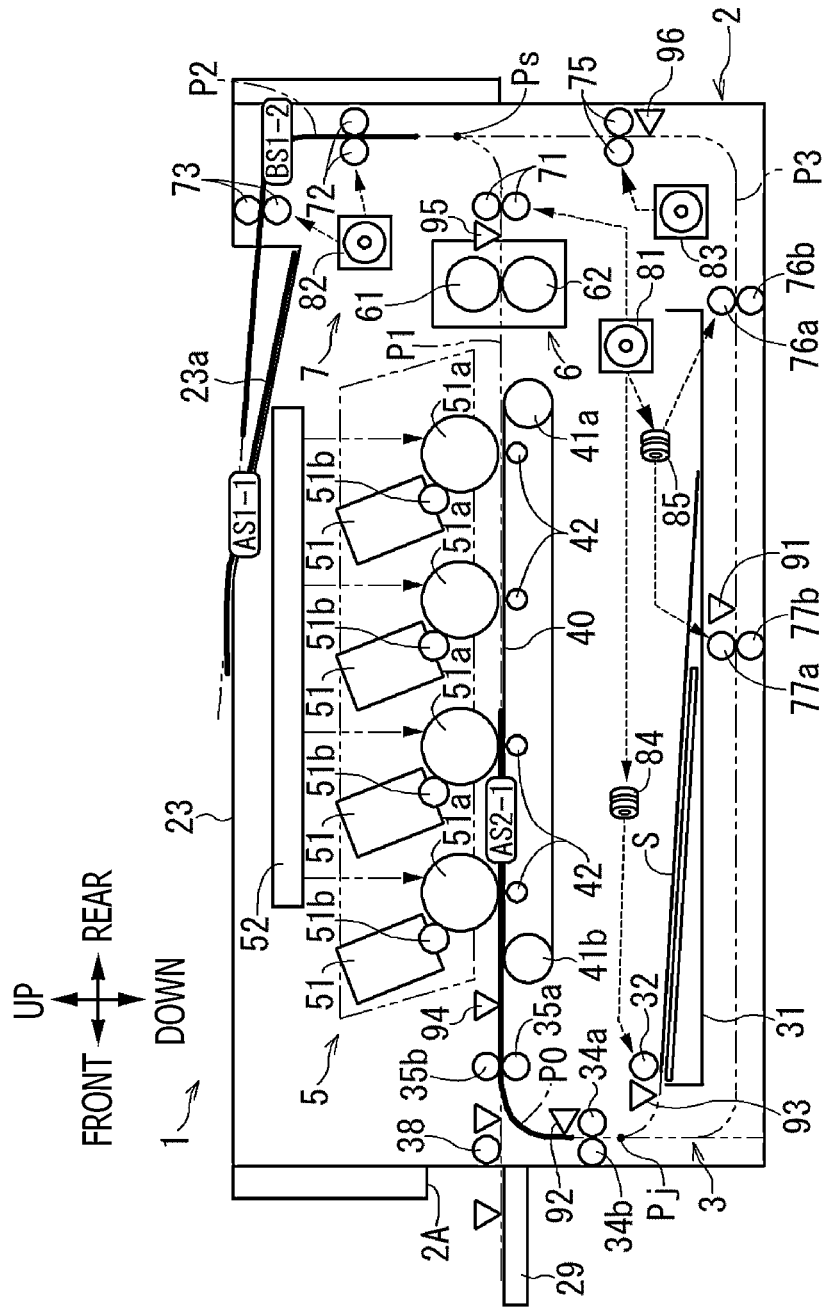
FIG. 10 is a schematic central cross-sectional view of the image forming apparatus in a state where the second sheet of the preceding job is fed to the feeding path.

As shown in FIG. 10, after the first sheet BS1-2 is fed to the reconveying path P3 in step S04, the second sheet AS2-1 that has been conveyed along the reconveying path P3 is reconveyed from the reconveying path P3 to the feeding path P0 through the junction point Pj (step S05). In this case, when there is a possibility that the second sheet AS2-1 and the first sheet BS1-2 interfere with each other, as with the case of the first sheet AS1-1, the controller 9 may reduce the conveying speed when conveying the second sheet AS2-1 along the reconveying path P3, or may cause to stop the second sheet AS2-1 in the reconveying path P3 for a predetermined time period.

The first sheet BS1-2 fed to the feeding path P0 is conveyed to the image forming engine 5, the image corresponding to the second page of the successive job is printed on one side of the sheet BS1-2, and then the first sheet BS1-2 is conveyed to the conveying path P1. That is, the first sheet BS1-2 of the successive job is fed from the sheet cassette 31 while printing the preceding job, and the image corresponding to the successive job is printed on one side of the first sheet BS1-2. The first sheet BS1-2 is further conveyed to the discharge path P2 through the branch point Ps.

The first sheet AS1-1 which the image corresponding to the first page of the preceding job is printed on the other side thereof is conveyed along the conveying path P1 and the discharge path P2, and discharged to the discharge tray 23a. In this case, the first sheet AS1-1 is fed from the sheet cassette 31 and passes through the image forming engine 5, and then the conveying direction of the first sheet AS1-1 is reversed in the discharge path P2. Then, after passing through the image forming engine 5 again via the reconveying path P3, the first sheet AS1-1 is discharged to the discharge tray 23a. Therefore, the other side of the first sheet AS1-1 discharged to the discharge tray 23a is facing downward. As described above, the controller 9 executes printing of the first sheet AS1 in the duplex printing mode in which printing is executed on both one side and the other side of the first sheet AS1.

Figure 11:
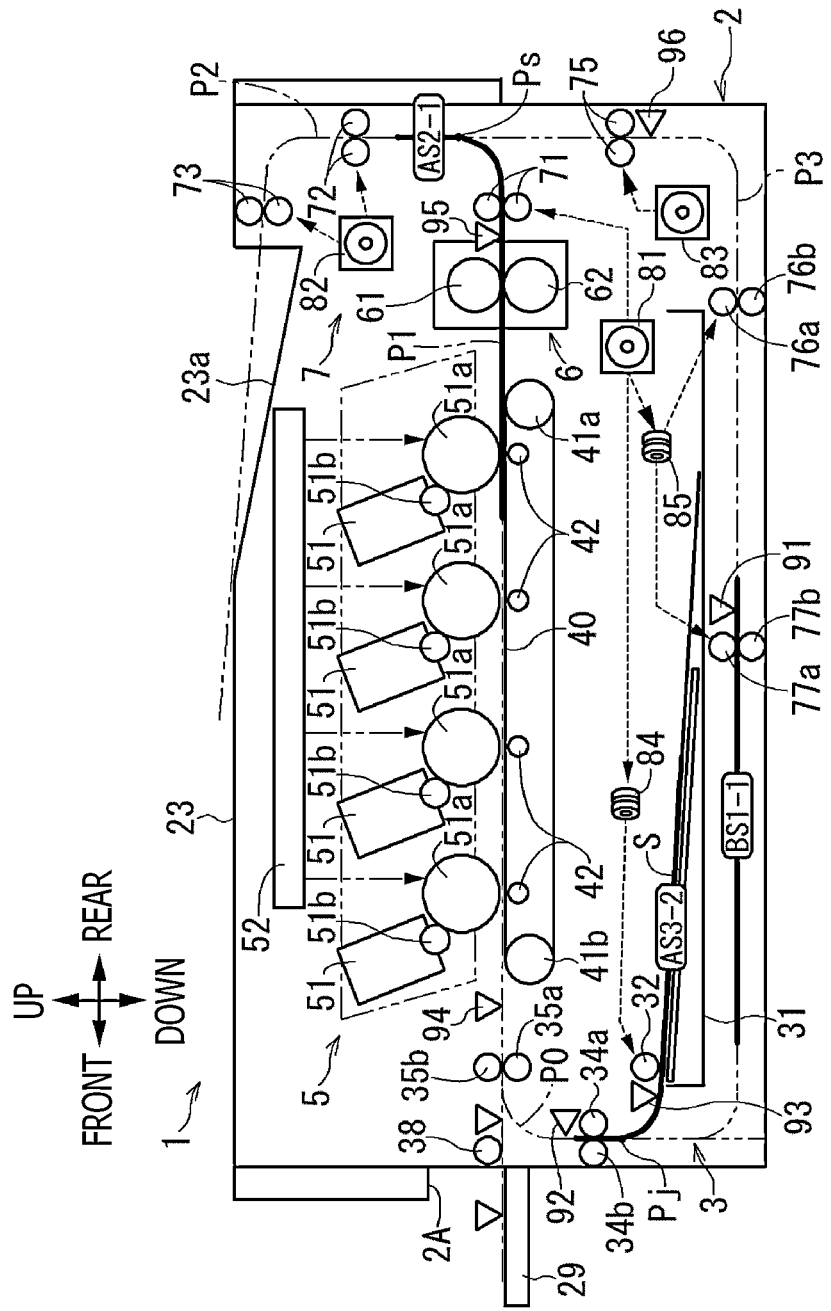
FIG. 11 is a schematic central cross-sectional view of the image forming apparatus in a state where the first sheet of the successive job is positioned in the reconveying path and a third sheet of the preceding job is fed to the feeding path.

As shown in FIG. 11, the first sheet BS1-2 conveyed along the discharge path P2 is conveyed toward the reconveying path P3 with the conveying direction reversed. The first sheet BS1-2 changes to the first sheet BS1-1 when the conveying direction is reversed. The first sheet BS1-1 is conveyed along the reconveying path P3 by the intermediate reconveying roller pair 75, and is further conveyed along the reconveying path P3 by the first reconveying roller 76a and the second reconveying roller 77a.

While conveying the first sheet BS1-1 along the reconveying path P3, the controller 9 determines whether the first sheet sensor 91 has detected the leading edge of the first sheet BS1-1, that is, whether the first sheet sensor 91 has switched from the OFF state to the ON state due to the leading edge of the first sheet BS1-1 reaching the first sheet sensor 91 (Step S06). When it is determined in Step S06 that the first sheet sensor 91 has not detected the leading edge of the first sheet BS1-1 (Step S06: No), the controller 9 repeatedly executes Step S06 until it is determined that the first sheet sensor 91 has detected the leading edge of the first sheet BS1-1.

When it is determined in step S06 that the first sheet sensor 91 has detected the leading edge of the first sheet BS1-1 (step S06: Yes), after a predetermined time period has elapsed since the first sheet sensor 91 has detected the leading edge of the first sheet BS1-1, the controller 9 switches the second electromagnetic clutch 85 from the transmission state to the cutoff state to cut off the transmission of the driving force from the first motor 81 to the first reconveying roller 76a and the second reconveying roller 77a, and causes the first sheet BS1-1 to stop in the reconveying path P3 (step S07).

That is, on condition that the first sheet sensor 91 has detected the leading edge of the first sheet BS1-1 which is the first sheet S of the successive job, the controller 9 switches the second electromagnetic clutch 85 from the transmission state to the cutoff state to cause the first sheet BS1-1 which the image corresponding to the second page of the successive job is printed on one side thereof to stop in the reconveying path P3. In this case, by switching the second electromagnetic clutch 85 to the cutoff state, when the first sheet BS1-1 which the successive job is printed on one side thereof is in the reconveying path P3, it is possible to cause the first sheet BS1-1 in the reconveying path P3 to stop while continuing the driving of other driving parts.

After the second sheet AS2-1 is reconveyed to the feeding path P0 in step S05, the controller 9 determines whether the second sheet sensor 92 has detected a trailing edge of the second sheet AS2-1, that is, whether the second sheet sensor 92 has switched from the ON state to the OFF state due to the trailing edge of the second sheet AS2-1 passing the second sheet sensor 92 (step S08). When it is determined in step S08 that the second sheet sensor 92 has not detected the trailing edge of the second sheet AS2-1 (step S08: No), the controller 9 repeatedly executes step S08 until it is determined that the second sheet sensor 92 has detected the trailing edge of the second sheet AS2-1.

When it is determined in step S08 that the second sheet sensor 92 has detected the trailing edge of the second sheet AS2-1 (step S08: Yes), the controller 9 feeds the third sheet AS3-2, which is the last sheet S of the preceding job, from the sheet cassette 31 to the feeding path P0 after a predetermined time period has elapsed since the second sheet sensor 92 has detected the trailing edge of the second sheet AS2-1 (step S09).

That is, the controller 9 starts feeding the third sheet AS3-2 to the feeding path P0 on condition that the second sheet sensor 92 has detected the trailing edge of the second sheet AS2-1 which is fed from the sheet cassette 31 before the third sheet AS3-2 and on which the image of to the preceding job is printed on one side.

The second sheet AS2-1, which had been conveyed to the feeding path P0, is conveyed to the image forming engine 5, the image corresponding to the third page of the preceding job is printed on the other side of the second sheet AS2-1 in the image forming engine 5, and then the second sheet AS2-1 is conveyed to the conveying path P1.

Figure 12:
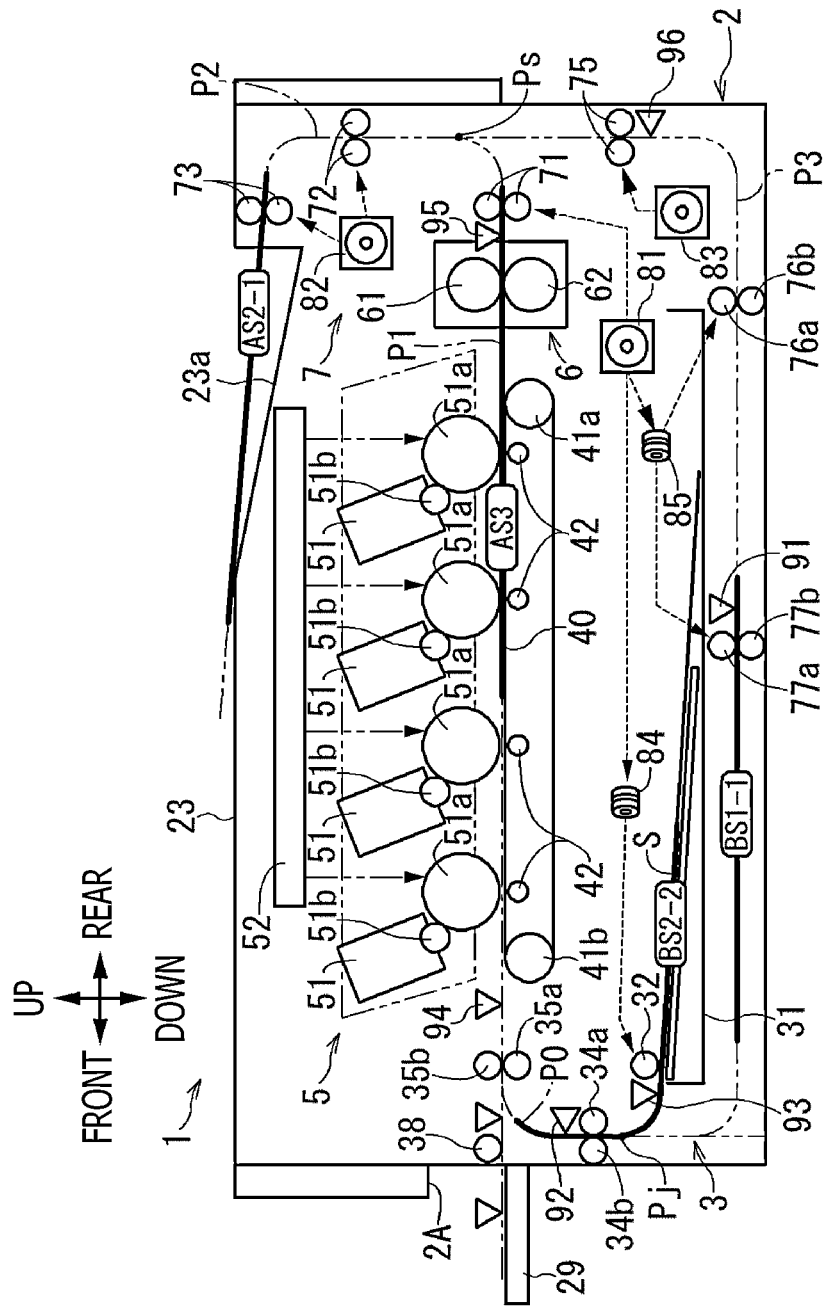
FIG. 12 is a central cross-sectional view showing the image forming apparatus in a state where a second sheet of the successive job is fed to the feeding path.

As shown in FIG. 12, the second sheet AS2-1 which the image corresponding to the third page of the preceding job is printed on the other side thereof and conveyed to the conveying path P1 is further conveyed along the discharge path P2 and is then discharged to the discharge tray 23a. In this case, the second sheet AS2-1 is fed from the sheet cassette 31 and passes through the image forming engine 5, and then the conveying direction of the second sheet AS2-1 is reversed in the discharge path P2. Then, after passing through the image forming engine 5 again via the reconveying path P3, the second sheet AS2-1 is discharged to the discharge tray 23a. Therefore, the other side of the second sheet AS2-1 discharged to the discharge tray 23a is facing downward. As described above, the controller 9 executes printing of the second sheet AS2 in the duplex printing mode in which printing is executed on both one side and the other side of the second sheet AS2.

The third sheet AS3-2 fed to the feeding path P0 in step S09 is conveyed to the image forming engine 5 and the image corresponding to the fifth page of the preceding job is printed on one side in the image forming engine 5, and then the third sheet AS3-2 is conveyed to the conveying path P1.

After the third sheet AS3-2 is fed to the feeding path P0 in step S09, the controller 9 feeds the second sheet BS2-2 from the sheet cassette 31 to the feeding path P0 (step S10). In this case, for example, the controller 9 may start feeding the second sheet BS2-2 after a predetermined time period has elapsed since the detection of the trailing edge of the third sheet AS3-2 passing the third sheet sensor 93. The controller 9 may alternatively start feeding the second sheet BS2-2 after a predetermined time period has elapsed since the detection of the trailing edge of the third sheet AS3-2 passing the second sheet sensor 92. In FIG. 12, the first sheet BS1-1 is stopped in the reconveying path P3.

Figure 13:
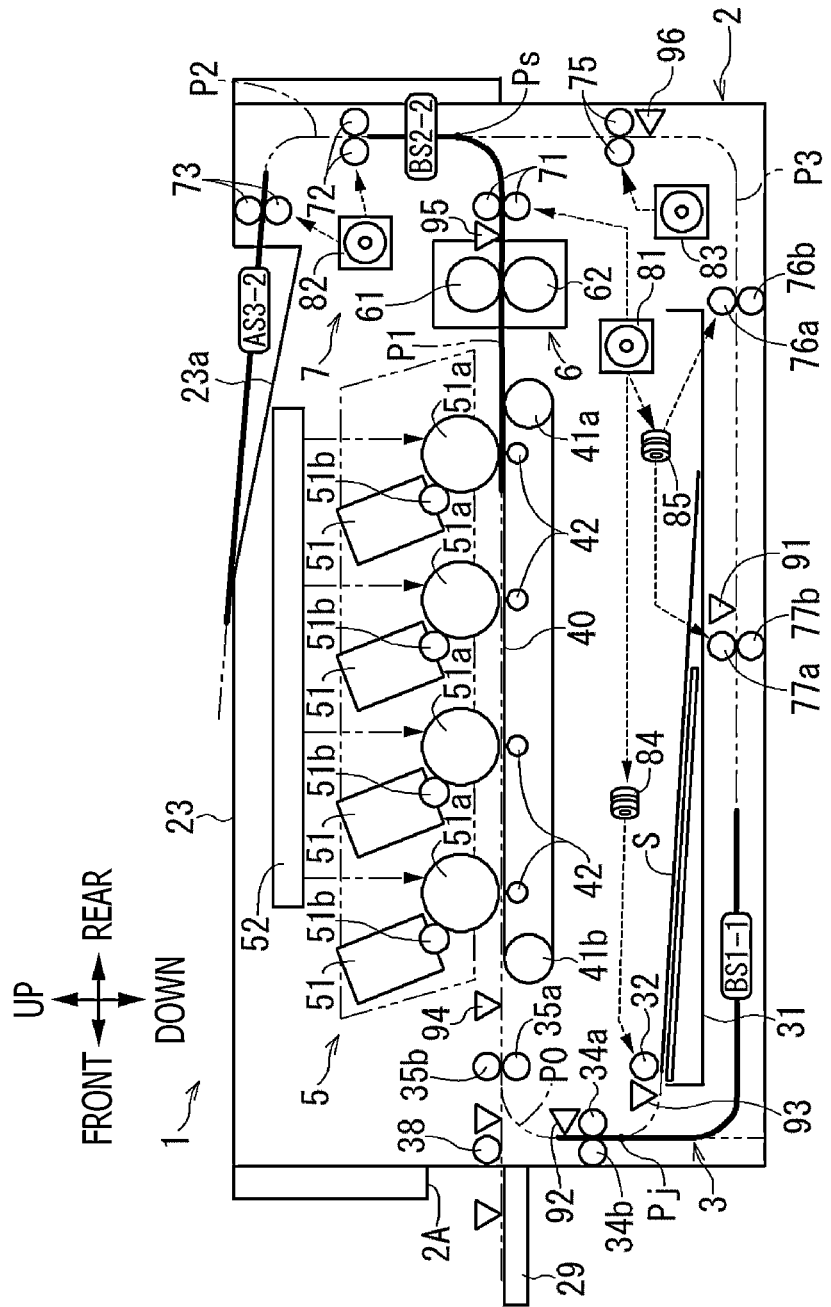
FIG. 13 is a schematic central cross-sectional view of the image forming apparatus in a state where the first sheet of the successive job that had been stopped in the reconveying path is fed to the feeding path.

As shown in FIG. 13, the third sheet AS3-2 which the image corresponding to the fifth page of the preceding job is printed on one side thereof and which is conveyed to the conveying path P1 is further conveyed along the discharge path P2 and is then discharged to the discharge tray 23a without being reconveyed to the reconveying path P3. In this case, the third sheet AS3-2 is fed from the sheet cassette 31, passes through the image forming engine 5, and is discharged to the discharge tray 23a without its conveying direction being reversed in the discharge path P2. Therefore, one side of the third sheet AS3-2 discharged to the discharge tray 23a is facing downward.

As described above, the controller 9 executes printing of the third sheet AS3-2 in the single-sided printing mode in which printing is executed only on one side of the third sheet AS3-2. That is, when printing the preceding job on the sheets S, the controller 9 executes printing of the first sheet AS1 and the second sheet AS2 in the duplex printing mode, switches the printing mode from the duplex printing mode to the single-sided printing mode, and executes printing of the third sheet AS3-2 in the single-sided printing mode.

In a state where the first sheet BS1-1 which the image corresponding to the second page of the successive job has been printed on one side thereof is stopped in the reconveying path P3, the controller 9 feeds the third sheet AS3-2 from the sheet cassette 31 to the image forming engine 5, prints the image corresponding to the fifth page which is the last page of the preceding job on one side of the fed third sheet AS3-2, and then discharges the third sheet AS3-2 which the image corresponding to the fifth page of the preceding job has been printed on one side thereof to the discharge tray 23a without reconveying the third sheet AS3-2 to the reconveying path P3.

As a result, a conveyance interval between the third sheet AS3-2 to which the last page of the preceding job whose page count is odd has been printed and the first sheet BS1-1 which the image of the successive job has been formed on one side thereof can be set to an appropriate interval, and the printing speed can be improved. In addition, the printing speed of the preceding job whose page count is odd can be improved.

In the present embodiment, in a state where the first sheet BS1-1 which the image is printed on one side thereof is stopped in the reconveying path P3, the controller 9 feeds the third sheet AS3-2 from the sheet cassette 31 to the image forming engine 5, and discharges the third sheet AS3-2 which the image is printed on one side thereof to the discharge tray 23a without reconveying to the reconveying path P3.

It should be noted that, in a state where at least a portion of the first sheet BS1-1 which the image is printed on one side thereof is in the reconveying path P3, the controller 9 may feed the third sheet AS3-2 from the sheet cassette 31 to the image forming engine 5, print the image corresponding to the last page of the successive job on one side of the fed third sheet AS3-2, and discharge the third sheet AS3-2 which the image is printed on one side thereof to the discharge tray 23a without reconveying to the reconveying path P3.

When printing the third sheet AS3-2 in the single-sided printing mode, the controller 9 executes control for changing at least one of a transfer current flowing when a voltage is applied to the transfer roller 42 and a fixing temperature when fixing the toner image on the sheet S by the fuser 6, as compared with when executing printing on the sheet S which is to be printed in the duplex printing mode.

For example, when printing the third sheet AS3-2 in the single-sided printing mode, the controller 9 executes at least one of control for making the transfer current higher than when printing in the duplex printing mode and control for making the fixing temperature higher than when printing in the duplex printing mode.

Moisture content of the sheet S which passed through the fuser 6 and is heated once decreases and the resistance increases. Therefore, when executing printing in the single-sided printing mode on the third sheet AS3-2 which is to be discharged after the last page of the preceding job is printed on one side, by setting the transfer current higher than in the duplex printing mode in which printing is to be executed on both sides of the sheet S, a voltage at the transfer roller 42 can be kept constant, and thus print quality in the single-sided printing mode and print quality in the duplex printing mode can be made the same.

Since the temperature of the sheet S that has once passed through the fuser 6 increases due to heating, the fixing temperature can be made constant by making the fixing temperature higher in the single-sided printing mode than in the duplex printing mode, and the print quality in the single-sided printing mode and the print quality in the duplex printing mode can be made the same.

The second sheet BS2-2 fed to the feeding path P0 in step S10 is conveyed to the image forming engine 5, the image corresponding to the fourth page of the successive job is printed on one side of the second sheet BS2-2, and the second sheet BS2-2 is conveyed to the conveying path P1. The second sheet BS2-2 is further conveyed to the discharge path P2 through the branch point Ps.

After the second sheet BS2-2 is fed to the feeding path P0 in step S10, the controller 9 determines whether the third sheet sensor 93 has detected the trailing edge of the second sheet BS2-2, that is, whether the third sheet sensor 93 has been switched from the on state to the off state due to the trailing edge of the second sheet BS2-2 passing the third sheet sensor 93 (step S11). When it is determined in step S11 that the third sheet sensor 93 has not detected the trailing edge of the second sheet BS2-2 (step S11: No), the controller 9 repeatedly executes step S11 until it is determined that the third sheet sensor 93 has detected the trailing edge of the second sheet BS2-2.

When it is determined in step S11 that the third sheet sensor 93 has detected the trailing edge of the second sheet BS2-2 (step S11: Yes), after a predetermined time period has elapsed since the third sheet sensor 93 has detected the trailing edge of the second sheet BS2-2, the controller 9 turns on the second electromagnetic clutch 85 to rotate the first reconveying roller 76a and the second reconveying roller 77a, and resumes the conveyance of the first sheet BS1-1 that has been stopped in the reconveying path P3. The first sheet BS1-1 of which conveyance has been resumed is re-conveyed from the reconveying path P3 to the feeding path P0 through the junction point Pj (step S12).

That is, on condition that the third sheet sensor 93 has detected the trailing edge of the second sheet BS2-2 fed from the sheet cassette 31 after the third sheet AS3-2, the controller 9 starts the reconveyance of the first sheet BS1-1 that has been stopped in the reconveying path P3 to the feeding path P0.

When it is advantageous to reduce the conveyance interval between the sheets S to be conveyed, the controller 9 may discharge the third sheet AS3-2 which the image is printed on one side thereof to the discharge tray 23a in a state where the reconveyance of the first sheet BS1-1 which has been stopped in the reconveying path P3 is started and the first sheet BS1-1 is in the feeding path P0.

Figure 14:
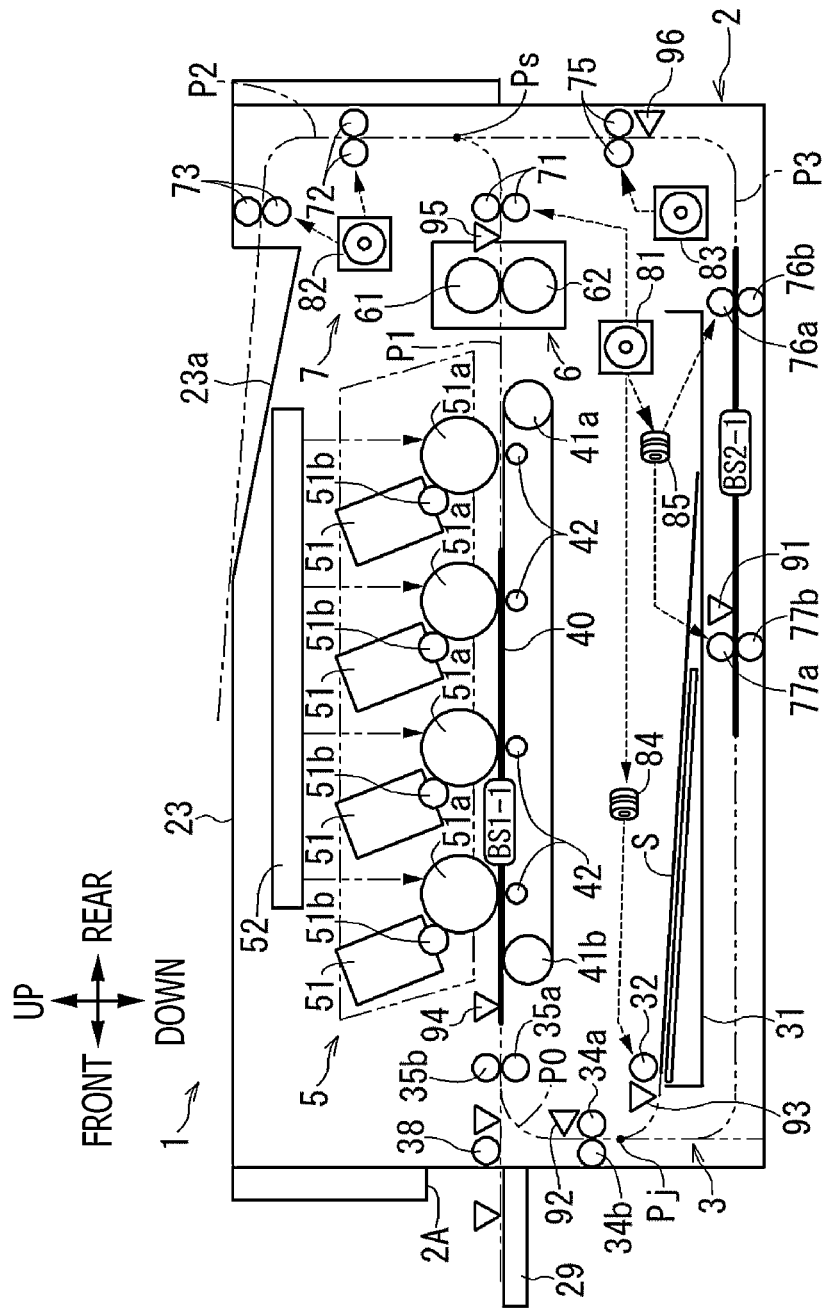
FIG. 14 is a schematic central cross-sectional view of the image forming apparatus in a state where the second sheet of the successive job is conveyed along the reconveying path and the first sheet of the successive job is conveyed to an image forming engine.

As shown in FIG. 14, the second sheet BS2-2 conveyed along the discharge path P2 is conveyed toward the reconveying path P3 with the conveying direction reversed. The second sheet BS2-2 changes to the second sheet BS2-1 when the conveying direction is reversed. The second sheet BS2-1 is conveyed along the reconveying path P3 by the intermediate reconveying roller pair 75, and further conveyed along the reconveying path P3 by the first reconveying roller 76a and the second reconveying roller 77a.

The first sheet BS1-1 of which conveyance from the reconveying path P3 is resumed in step S12 and which is reconveyed to the feeding path P0 is conveyed to the image forming engine 5, and the image corresponding to the first page of the successive job is printed on the other side.

Figure 15:
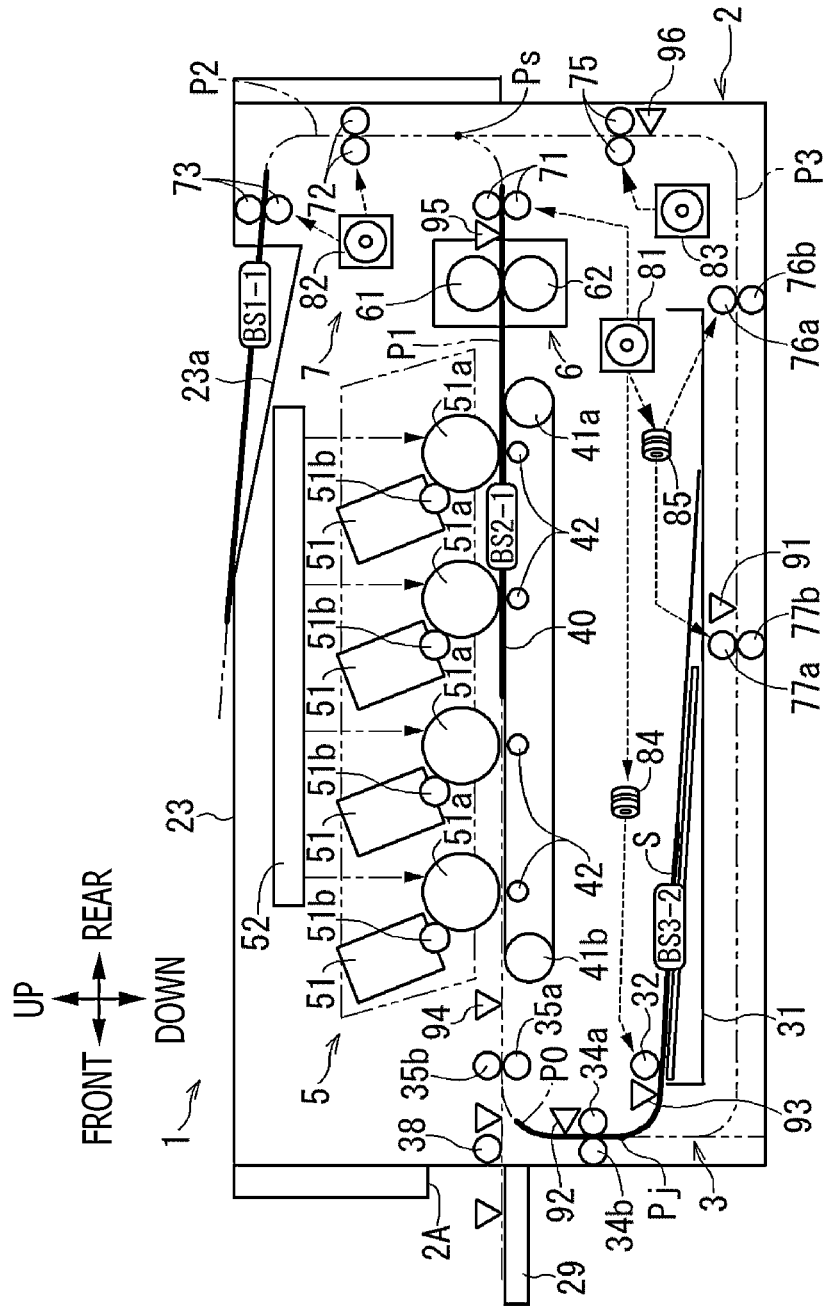
FIG. 15 is a schematic central cross-sectional view of the image forming apparatus in a state where a third sheet of the successive job is fed to the feeding path after the second sheet of the successive job is fed to the feeding path.

As shown in FIG. 15, the first sheet BS1-1 which the image corresponding to the first page of the successive job has been printed on the other side thereof is conveyed along the conveying path P1 and the discharge path P2, and is discharged to the discharge tray 23a. In this case, the first sheet BS1-1 is fed from the sheet cassette 31 and passes through the image forming engine 5, and then the conveying direction of the first sheet BS1-1 is reversed in the discharge path P2. Then, after passing through the image forming engine 5 again via the reconveying path P3, the first sheet BS1-1 is discharged to the discharge tray 23a. Therefore, the other side of the first sheet BS1-1 discharged to the discharge tray 23a is facing downward. As described above, the controller 9 executes printing of the first sheet BS1 in the duplex printing mode in which printing is executed on both one side and the other side of the first sheet BS1.

After the first sheet BS1-1 is reconveyed to the feeding path P0 in step S12, the controller 9 causes the second sheet BS2-1 conveyed along the reconveying path P3 to be reconveyed from the reconveying path P3 to the feeding path P0 through the junction point Pj (step S13). In this case, for example, the controller 9 may reconvey the second sheet BS2-1 to the feeding path P0 after a predetermined time period has elapsed since detecting that the trailing edge of the first sheet BS1-1 has passed the second sheet sensor 92 to suppress interference between the first sheet BS1-1 and the second sheet BS2-1.

The second sheet BS2-1 reconveyed to the feeding path P0 is conveyed to the image forming engine 5, the image corresponding to the third page of the successive job is printed on the other side of the second sheet BS2-1, and is then conveyed to the conveying path P1. The second sheet BS2-1 which the image corresponding to the third page of the successive job is printed on the other side thereof and conveyed to the conveying path P1 is further conveyed along the discharge path P2 and is then discharged to the discharge tray 23a.

In this case, the second sheet BS2-1 is fed from the sheet cassette 31 and passes through the image forming engine 5, and then the conveying direction of the second sheet BS2-1 is reversed in the discharge path P2. Then, after passing through the image forming engine 5 again via the reconveying path P3, the second sheet BS2-1 is discharged to the discharge tray 23a. Therefore, the other side of the second sheet BS2-1 discharged to the discharge tray 23a is facing downward. As described above, the controller 9 executes printing of the second sheet BS2 in the duplex printing mode in which printing is executed on both one side and the other side of the second sheet BS2.

After the second sheet BS2-1 is reconveyed to the feeding path P0 in step S13, the controller 9 feeds the third sheet BS3-2 from the sheet cassette 31 to the feeding path P0 (step S14). In this case, the controller 9 can feed the third sheet BS3-2 from the sheet cassette 31 to the feeding path P0 after a predetermined time period has elapsed since the second sheet sensor 92 has detected the trailing edge of the second sheet BS2-1.

The third sheet BS3-2 fed to the feeding path P0 in step S14 is conveyed to the image forming engine 5, and after the image corresponding to the fifth page of the successive job is printed on one side of the third sheet BS3-2 in the image forming engine 5, the third sheet BS3-2 is conveyed to the conveying path P1. The third sheet BS3-2 is further conveyed along the discharge path P2 and is then discharged to the discharge tray 23a without being reconveyed to the reconveying path. In this case, the third sheet BS3-2 is fed from the sheet cassette 31 and passes through the image forming engine 5, and is then discharged to the discharge tray 23a without its conveying direction being reversed in the discharge path P2. Therefore, one side of the third sheet BS3-2 discharged to the discharge tray 23a is facing downward.

As described above, the controller 9 executes printing of the third sheet BS3-2 in the single-sided printing mode in which printing is executed only on one side of the third sheet BS3-2. That is, when printing the successive job to the sheet S, the controller 9 executes printing of the first sheet BS1 and the second sheet BS2 in the duplex printing mode, switches the printing mode from the duplex printing mode to the single-sided printing mode, and executes printing of the third sheet BS3-2 in the single-sided printing mode.

When executing printing of the third sheet BS3-2 in the single-sided printing mode, similarly to when executing printing on the third sheet AS3-2 in the single-sided printing mode, the controller 9 can execute control for changing at least one of the transfer current flowing when the voltage is applied to the transfer roller 42 and the fixing temperature when fixing the toner image on the sheet S by the fuser 6, as compared with when executing printing on the sheet S which is to be printed in the duplex printing mode.

When the third sheet BS3-2 is discharged to the discharge tray 23a, the conveyance control of the sheets S by the controller 9 ends.

As described above, in the conveyance control by the controller 9 of the present embodiment, the first sheet BS1-1, which is the first sheet S of the successive job, is fed from the sheet cassette 31 while printing the preceding job, and the third sheet AS3-2, which is the last sheet S of the preceding job, is discharged to the discharge tray 23a in a state where the first sheet BS1-1 which an image is printed on one side thereof is in the feeding path P0 or the reconveying path P3. As a result, the conveyance interval between the sheets S to which the preceding job and the successive job are to be printed can be reduced, and the printing speed can be improved.

In particular, the controller 9 starts feeding the third sheet AS3-2 from the sheet cassette 31 to the feeding path P0 on condition that the second sheet sensor 92 has detected the trailing edge of the second sheet AS2-1 which is fed from the sheet cassette 31 before the third sheet AS3-2 and which the image corresponding to the preceding job is printed on one side thereof. Therefore, the conveyance interval between the second sheet AS2-1 and the third sheet AS3-2 can be reduced, and the printing speed can be improved.

The controller 9 starts reconveying the first sheet BS1-1 that has been stopped in the reconveying path P3 to the feeding path P0 on condition that the third sheet sensor 93 has detected the trailing edge of the second sheet BS2-2 fed from the sheet cassette 31 after the third sheet AS3-2. Therefore, the conveyance interval between the second sheet BS2-2 fed from the sheet cassette 31 and the first sheet BS1-1 that has been stopped in the reconveying path P3 can be reduced, and the printing speed can be improved.

In the conveyance control by the controller 9, the preceding job whose page count is five is printed in the order of the second page on the first sheet AS1-2, the fourth page on the second sheet AS2-2, the first page on the first sheet AS1-1, the third page on the second sheet AS2-1, and the fifth page of the preceding job on the third sheet AS3-2. The successive job whose page count is five is printed in the order of the second page on the first sheet BS1-2, the fourth page on the second sheet AS2-2, the first page on the first sheet BS1-1, the third page on the second sheet BS2-1, and the fifth page on the third sheet BS3-2.

As a result, it is possible to improve the printing speed when executing the duplex printing of the preceding job and the successive job whose page counts are five.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

First Modification of Conveyance Control

In the above-described embodiment, the 2416 conveyance control in the case where the preceding job whose page count is five and the successive job whose page count is five are successively printed has been described. However, the preceding job whose page count is six and the successive job whose page count is six can also be successively printed by the 2416 conveyance control.

Figure 16:
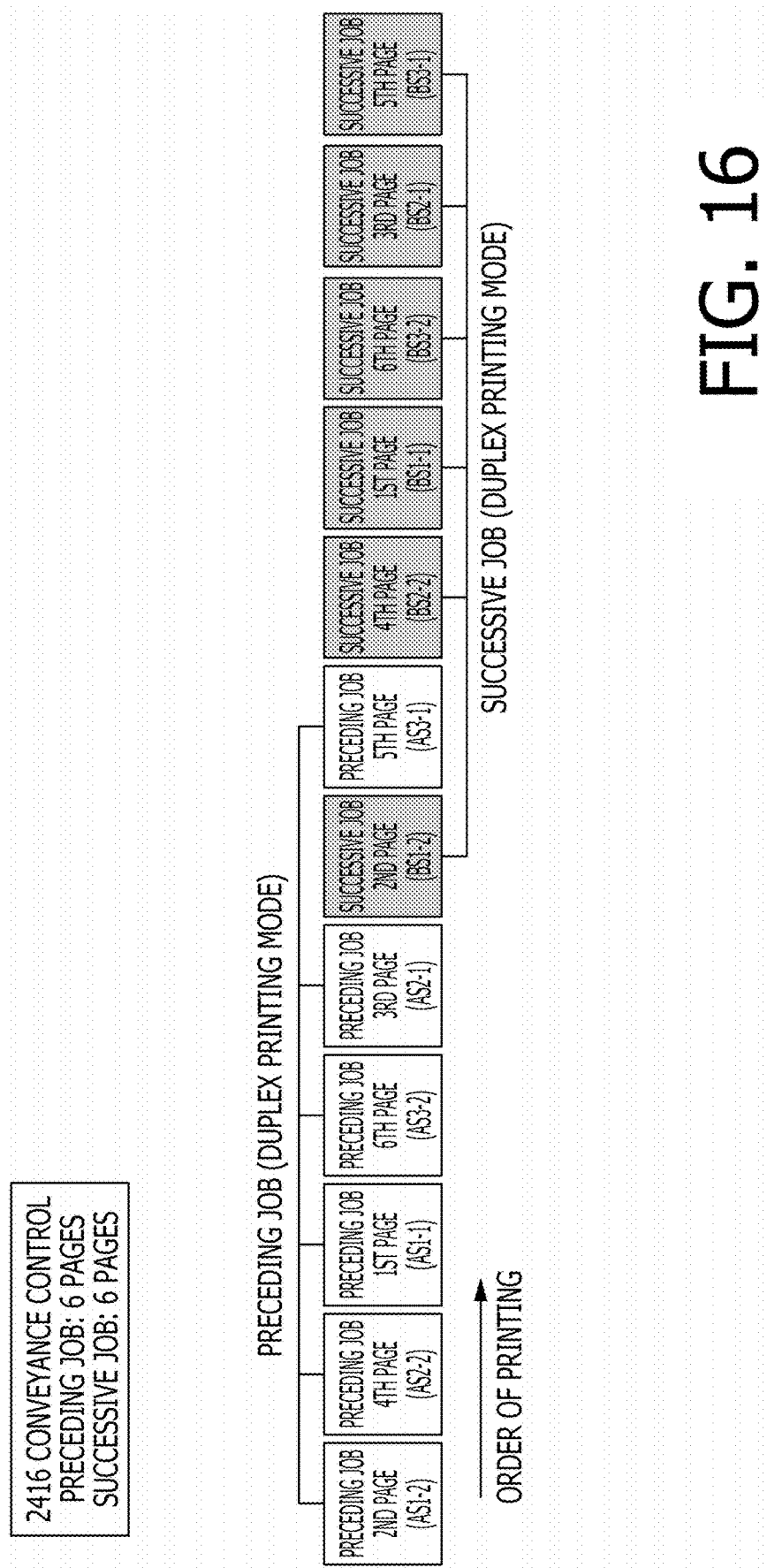
FIG. 16 is a diagram showing a printing order in a 2416 conveyance control when a page count of the preceding job is six and a page count of the successive job is six.

As shown in FIG. 16, in the 2416 conveyance control in which a preceding job whose page count is six and a successive job whose page count is six are successively printed, printing on the sheets S is executed in the order of a first sheet AS1-2 (second page of the preceding job), a second sheet AS2-2 (fourth page of the preceding job), a first sheet AS1-1 (first page of the preceding job), a third sheet AS3-2 (sixth page of the preceding job), a second sheet AS2-1 (third page of preceding job), a first sheet BS1-2 (second page of the successive job), a third sheet AS3-1 (fifth page of the preceding job) a second sheet BS2-2 (fourth page of the successive job), a first sheet BS1-1 (first page of the successive job), a third sheet BS3-2 (sixth page of the successive job), a second sheet BS2-1 (third page of the successive job), and a third sheet BS3-1 (fifth page of the successive job).

In this case, the first sheet S which an image corresponding to the second page of the preceding job is to be printed on one side thereof is referred to as the first sheet AS1-2, the first sheet S which an image corresponding to the first page of the preceding job is to be printed on the other side thereof is referred to as the first sheet AS1-1, the second sheet S which an image corresponding to the fourth page of the preceding job is to be printed on one side thereof is referred to as the second sheet AS2-2, the second sheet S which an image corresponding to the third page of the preceding job is to be printed on the other side thereof is referred to as the second sheet AS2-1, the third sheet S which an image corresponding to the sixth page of the preceding job is to be printed on one side thereof is referred to as the third sheet AS3-2, and the third sheet S which an image corresponding to the fifth page of the preceding job is to be printed on the other side thereof is referred to as the third sheet AS3-1.

Similarly, the first sheet S which an image corresponding to the second page of the successive job is to be printed on one side thereof is referred to as the first sheet BS1-2, the first sheet S which an image corresponding to the first page of the successive job is to be printed on the other side thereof is referred to as the first sheet BS1-1, the second sheet S which an image corresponding to the fourth page of the successive job is to be printed on one side thereof is referred to as the second sheet BS2-2, the second sheet S which an image corresponding to the third page of the successive job is to be printed on the other side thereof is referred to as the second sheet BS2-1, the third sheet S which an image corresponding to the sixth page of the successive job is to be printed on one side thereof is referred to as the third sheet BS3-2, and the third sheet S which an image corresponding to the fifth page of the successive job is to be printed on the other side thereof is referred to as the third sheet BS3-1.

The controller 9 executes printing of the first sheet AS1, the second sheet AS2, and the third sheet AS3 in the duplex printing mode when printing the preceding job whose page count is six on the sheets S, and executes printing of the first sheet BS1, the second sheet BS2, and the third sheet BS3 in the duplex printing mode when printing the subsequent job whose page count is six on the sheets S.

As described above, even when executing successive duplex printing in which the preceding job whose page count is six (i.e., even) and the successive job whose page count is six (i.e., even) are to be successively printed in duplex printing, it is possible to apply the conveyance control of feeding the first sheet S of the successive job from the sheet cassette 31 while printing the preceding job, printing an image of the successive job on one side of the first sheet S of the successive job, and discharging the last sheet S of the preceding job on the discharge tray 23a in a state where the first sheet S of the successive job which the image has been printed on one side thereof is in the feeding path P0 or the reconveying path P3.

Furthermore, provided that the page count of the preceding job is three or more and the page count of the successive job is two or more, the conveyance control of the above-described embodiment can also be applied when the page count of the preceding job is odd and the page count of the successive page is even, and when the page count of the preceding job is even and the page count of the successive job is odd.

In the above-described embodiment, the case where two successive jobs are printed in duplex printing has been described. However, the 2416 conveyance control described above may be applied when printing one job. For example, when information on the number of copies is included in a job and the n th and n+1 th copies are to be successively printed in duplex printing, the conveyance control of the above-described embodiment by the 2416 conveyance control can be applied.

Second Modification of Conveyance Control

In the above-described embodiment, the case where the controller 9 executes the 2416 conveyance control has been described. However, in the successive duplex printing of the preceding job whose page count is three or more and the successive job whose page count is two or more, the conveyance control of feeding the first sheet S of the successive job from the sheet cassette 31 while printing the preceding job, printing an image of the successive job on one side of the first sheet S of the successive job, and discharging the last sheet S of the preceding job on the discharge tray 23a in a state where the first sheet S of the successive job which the image has been printed on one side thereof is in the feeding path P0 or the reconveying path P3 can also be applied when executing the 2461 conveyance control.

Figure 17:
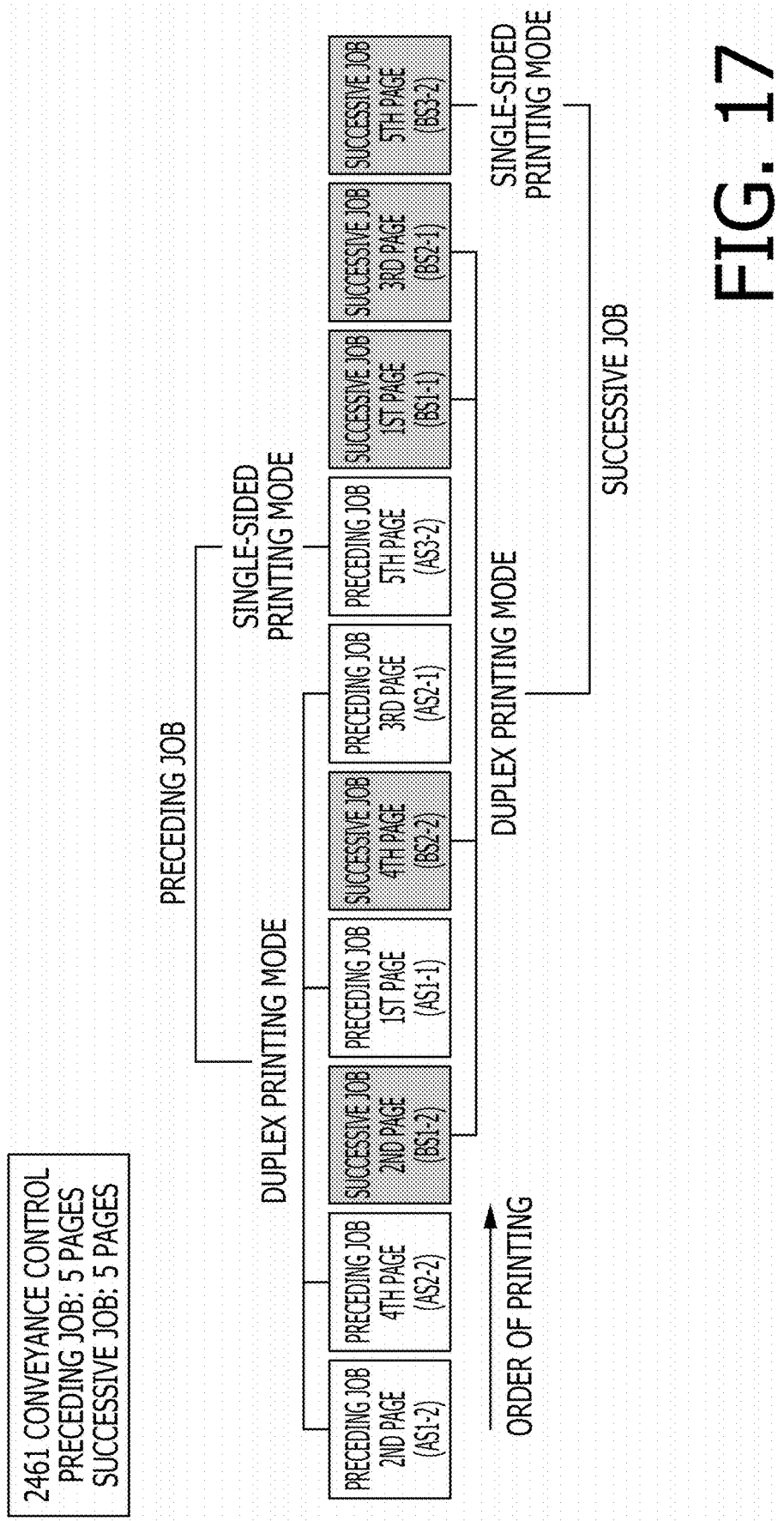
FIG. 17 is a diagram showing a printing order in a 2461 conveyance control.

As shown in FIG. 17, for example, in the 2461 conveyance control in a case where the page count of the preceding job is five and the page count of the successive job is five, printing of the sheets S is executed in the order of a first sheet AS1-2 (second page of the preceding job), a second sheet AS2-2 (fourth page of the preceding job), a first sheet BS1-2 (second page of the successive job), a first sheet AS1-1 (first page of the preceding job), a second sheet BS2-2 (fourth page of the successive job), a second sheet AS2-1 (third page of the preceding job), a third sheet AS3-2 (fifth page of the preceding job), a first sheet BS1-1 (first page of the successive job), a second sheet BS2-1 (third page of the successive job), and a third sheet BS3-2 (fifth page of the successive job).

In this case, the first sheet S which an image corresponding to the second page of the preceding job is to be printed on one side thereof is referred to as the first sheet AS1-2, the first sheet S which an image corresponding to the first page of the preceding job is to be printed on the other side thereof is referred to as the first sheet AS1-1, the second sheet S which an image corresponding to the fourth page of the preceding job is to be printed on one side thereof is referred to as the second sheet AS2-2, the second sheet S which an image corresponding to the third page of the preceding job is to be printed on the other side thereof is referred to as the second sheet AS2-1, and the third sheet S which an image corresponding to the fifth page of the preceding job is to be printed on one side thereof is referred to as the third sheet AS3-2.

Similarly, the first sheet S which an image corresponding to the second page of the successive job is to be printed on one side thereof is referred to as the first sheet BS1-2, the first sheet S which an image corresponding to the first page of the successive job is to be printed on the other side thereof is referred to as the first sheet BS1-1, the second sheet S which an image corresponding to the fourth page of the successive job is to be printed on one side thereof is referred to as the second sheet BS2-2, the second sheet S which an image corresponding to the third page of the successive job is to be printed on the other side thereof is referred to as the second sheet BS2-1, and the third sheet S which an image corresponding to the fifth page of the successive job is to be printed on one side thereof is referred to as the third sheet BS3-2.

When successively executing duplex printing of the preceding job whose page count is five and the subsequent job whose page count is five by the 2461 conveyance control, when printing the preceding job on the sheets S, the controller 9 executes printing of the first sheet AS1 and the second sheet AS2 in the duplex printing mode, and then switches the printing mode from the duplex printing mode to the single-sided printing mode to execute printing of the third sheet AS3-2 in the single-sided printing mode. Similarly, when printing the successive job on the sheet S, the controller 9 executes printing of the first sheet BS1 and the second sheet BS2 in the duplex printing mode, and then switches the printing mode from the duplex printing mode to the single-sided printing mode to execute printing of the third sheet BS3-2 in the single-sided printing mode.

As described above, the conveyance control of the above-described embodiment can be applied even when successively printing the preceding job whose page count is five (i.e., odd) and the successive job whose page count is five (i.e., odd) in duplex printing by the 2461 conveyance control.

When the page count of the preceding job is three or more and the page count of the successive job is two or more, the conveyance control of the above-described embodiment by the 2461 conveyance control can be applied even when the page count of the preceding job is even and the page count of the successive job is even, when the page count of the preceding job is odd and the page count of the successive job is even, and when the page count of the preceding job is even and the page count of the successive job is odd.

The first feeding roller 32 is an example of a feeding roller according to aspects of the present disclosure configured to feed a sheet supported by a sheet tray to the feeding path. The registration roller 35a is an example of a first conveying roller according to aspects of the present disclosure, and the conveying roller 34a is an example of a second conveying roller according to aspects of the present disclosure. The sheet cassette 31 is an example of a sheet tray according to aspects of the present disclosure configured to support sheets to be fed to the image forming engine. The second electromagnetic clutch 85 is an example of a clutch according to aspects of the present disclosure configured to switch between a transmission state in which the driving force is transmitted to the reconveying roller and a cutoff state in which the transmission of the driving force to the reconveying roller is cut off. The third sheet AS3 is an example of a last sheet of the preceding job according to aspects of the present disclosure. The second sheet AS2 is an example of a next-to-last sheet of the preceding job according to aspects of the present disclosure to be fed from the sheet tray before the last sheet of the preceding job. The first sheet BS1 is an example of a first sheet of the successive job according to aspects of the present disclosure. A side of the first sheet AS1-2 on which the image corresponding to the second page of the preceding job is to be printed is an example of one side of the first sheet according to aspects of the present disclosure. A side of the first sheet AS1-1 on which the image corresponding to the first page of the preceding job is to be printed is an example of the other side of the first sheet according to aspects of the present disclosure. A side of the second sheet AS2-2 on which the image corresponding to the fourth page of the preceding job is to be printed is an example of one side of the second sheet according to aspects of the present disclosure. A side of the second sheet AS2-1 on which the image corresponding to the third page of the preceding job is to be printed is an example of the other side of the second sheet according to aspects of the present disclosure. A side of the third sheet AS3-2 on which the image corresponding to the fifth page of the preceding job is to be printed is an example of one side of the third sheet according to aspects of the present disclosure. A side of the first sheet BS1-2 on which the image corresponding to the second page of the successive job is to be printed is an example of one side of the first sheet according to aspects of the present disclosure. A side of the first sheet BS1-1 on which the image corresponding to the first page of the successive job is to be printed is an example of the other side of the first sheet according to aspects of the present disclosure. A side of the second sheet BS2-2 on which the image corresponding to the fourth page of the successive job is to be printed is an example of one side of the second sheet according to aspects of the present disclosure. A side of the second sheet BS2-1 on which the image corresponding to the third page of the successive job is to be printed is an example of the other side of the second sheet according to aspects of the present disclosure. A side of the third sheet BS3-2 on which the image corresponding to the fifth page of the successive job is to be printed is an example of one side of the third sheet according to aspects of the present disclosure.

What is claimed is:

1. An image forming apparatus, comprising:
   an image forming engine configured to form an image on a sheet;
   a sheet tray configured to support sheets to be fed to the image forming engine;
   a discharge tray to which a sheet to which an image has been formed by the image forming engine is to be discharged;

a main body including the image forming engine, a feeding path configured to feed a sheet from the sheet tray to the image forming engine, and a reconveying path configured to reconvey a sheet which an image has been formed on one side thereof to the feeding path;
and a controller configured to, when executing a successive duplex printing of successively printing a preceding job whose page count is three or more and a successive job whose page count is two or more in duplex printing:
   feed a first sheet of the successive job from the sheet tray while printing the preceding job and print an image corresponding to the successive job on one side of the first sheet of the successive job, and
   discharge a last sheet of the preceding job to the discharge tray in a state where the first sheet of the successive job which the image has been formed on the one side thereof is in the feeding path or the reconveying path,
wherein, in the successive duplex printing when a page count of the preceding job is odd, the controller is configured to:
   feed a last sheet of the preceding job from the sheet tray in a state where at least a portion of the first sheet of the successive job which an image has been formed on the one side thereof is in the reconveying path;
   print an image corresponding to the last page of the preceding job on the one side of the fed last sheet of the preceding job; and
   discharge the last sheet of the preceding job which the image has been formed on the one side thereof to the discharge tray without conveying the last sheet of the preceding job to the reconveying path.

2. The image forming apparatus according to claim 1, wherein printing of the preceding job whose page count is five is executed in the order of a second page on one side of a first sheet, a fourth page on one side of a second sheet, a first page on the other side of the first sheet, a third page on the other side of the second sheet, and a fifth page on one side of the third sheet.

3. The image forming apparatus according to claim 1, wherein the reconveying path is located below the sheet tray.

4. The image forming apparatus according to claim 3, wherein the controller is configured to feed the last sheet of the preceding job from the sheet tray in a state where the first sheet of the successive job which an image has been printed on the one side thereof is stopped in the reconveying path.

5. The image forming apparatus according to claim 4, wherein the main body further includes:
   a reconveying roller disposed in the reconveying path and configured to convey a sheet toward the feeding path;
   a first sheet sensor disposed in the reconveying path and configured to detect a sheet; and
   a clutch configured to switch between a transmission state in which the driving force is transmitted to the reconveying roller and a cutoff state in which the transmission of the driving force to the reconveying roller is cut off,
wherein the controller is configured to switch the clutch from the transmission state to the cutoff state and cause the first sheet of the successive job to stop in the reconveying path on condition that the first sheet sensor has detected the first sheet of the successive job.

6. The image forming apparatus according to claim 5, wherein the clutch is an electromagnetic clutch.

7. The image forming apparatus according to claim 3, wherein the main body further includes:
   a feeding roller configured to feed a sheet supported by the sheet tray to the feeding path;
   a first conveying roller disposed in the feeding path downstream of the feeding roller in a conveying direction;
   a second conveying roller disposed in the feeding path between the feeding roller and the first conveying roller and downstream of a junction point between the feeding path and the reconveying path in the sheet conveying direction; and
   a second sheet sensor disposed in the feeding path between the first conveying roller and the second conveying roller and configured to detect a sheet,
wherein the controller is configured to start feeding the last sheet of the preceding job from the sheet tray to the feeding path on condition that the second sheet sensor has detected a trailing edge of a second-to-last sheet of the preceding job which was fed from the sheet tray before the last sheet of the preceding job and which an image corresponding to the preceding job has been printed on the one side thereof.

8. The image forming apparatus according to claim 4, wherein the main body further includes:
   a feeding roller configured to feed a sheet supported by the sheet tray to the feeding path;
   a first conveying roller disposed in the feeding path downstream of the feeding roller in the conveying direction; and
   a third sheet sensor disposed in the feeding path between the feeding roller and the first conveying roller and configured to detect a sheet,
wherein the controller is configured to start reconveying the first sheet of the successive job stopped in the reconveying path to the feeding path on condition that the third sheet sensor has detected a trailing edge of a sheet fed from the sheet tray next to the last sheet of the preceding job.

9. The image forming apparatus according to claim 1, wherein the image forming engine includes:
   a photosensitive drum on which a toner image is to be formed;
   a transfer roller disposed to face the photosensitive drum and to which a voltage is to be applied; and
   a fuser configured to fix the toner image transferred onto a sheet,
wherein, when executing printing of the last sheet of the preceding job, the controller is configured to change a transfer current flowing when a voltage is applied to the transfer roller, a fixing temperature when fixing the toner image onto the sheet by the fuser, or both the transfer current and the fixing temperature, as compared to when printing on a sheet which printing is to be executed on both sides thereof.

10. The image forming apparatus according to claim 9, wherein, when executing printing of the last sheet of the preceding job, the controller is configured to increase the transfer current, increase the fixing temperature, or increase both the transfer current and the fixing temperature, as compared to when printing on a sheet which printing is to be executed on both sides thereof.

11. An image forming apparatus comprising:

an image forming engine configured to form an image on a sheet;

a sheet tray configured to support sheets to be fed to the image forming engine;

a discharge tray to which a sheet to which an image has been formed by the image forming engine is to be discharged;

a main body including the image forming engine, a feeding path configured to feed a sheet from the sheet tray to the image forming engine, and a reconveying path configured to reconvey a sheet which an image has been formed on one side thereof to the feeding path;

and a controller configured to, when executing a successive duplex printing of successively printing an $n^{th}$ copy whose page count is three or more and an $n+1^{th}$ copy whose page count is two or more in duplex printing:

feed a first sheet of the $n+1^{th}$ copy from the sheet tray while printing the $n^{th}$ copy and print an image corresponding to the $n+1^{th}$ copy on one side of the first sheet of the $n+1^{th}$ copy, and discharge a last sheet of the $n^{th}$ copy to the discharge tray in a state where the first sheet of the $n+1^{th}$ copy which the image has been formed on the one side thereof is in the feeding path or the reconveying path, wherein, in the successive duplex printing when a page count of the $n^{th}$ copy is odd, the controller is configured to:

feed a last sheet of the $n^{th}$ copy from the sheet tray in a state where at least a portion of the first sheet of the $n+1^{th}$ copy which an image has been formed on the one side thereof is in the reconveying path;

print and image corresponding to the last page of the $n^{th}$ copy on the one side of the fed last sheet of the $n^{th}$ copy; and discharge the last sheet of the $n^{th}$ copy which the image has been formed on the one side thereof to the discharge tray without conveying the last sheet of the $n^{th}$ copy to the reconveying path.

* * * * *